(12) United States Patent
Harushige et al.

(10) Patent No.: US 10,343,358 B2
(45) Date of Patent: Jul. 9, 2019

(54) METHOD FOR PRODUCING BELT, AND TWO-LAYER BONDING MACHINE

(71) Applicant: BANDO CHEMICAL INDUSTRIES, LTD., Kobe-shi, Hyogo (JP)

(72) Inventors: Naohisa Harushige, Kobe (JP); Yohei Hattori, Kobe (JP); Koichi Hosokawa, Kobe (JP); Hisashi Izumi, Kobe (JP); Tomoaki Hata, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/118,247

(22) Filed: Aug. 30, 2018

(65) Prior Publication Data

US 2018/0370168 A1   Dec. 27, 2018

Related U.S. Application Data

(63) Continuation of application No. PCT/JP2017/000306, filed on Jan. 6, 2017.

(30) Foreign Application Priority Data

Mar. 30, 2016   (JP) .................................. 2016-069527

(51) Int. Cl.
| | | |
|---|---|---|
| *B29D 29/10* | (2006.01) | |
| *F16G 1/28* | (2006.01) | |
| *F16G 5/06* | (2006.01) | |
| *F16G 5/20* | (2006.01) | |
| *B29D 29/08* | (2006.01) | |
| *B32B 3/30* | (2006.01) | |
| *F16G 1/00* | (2006.01) | |
| *B32B 25/08* | (2006.01) | |

(52) U.S. Cl.
CPC ........... *B29D 29/103* (2013.01); *B29D 29/08* (2013.01); *B29D 29/10* (2013.01); *B32B 3/30* (2013.01); *B32B 25/08* (2013.01); *F16G 1/00* (2013.01); *F16G 1/28* (2013.01); *F16G 5/06* (2013.01); *F16G 5/20* (2013.01); *B32B 2260/021* (2013.01); *B32B 2307/306* (2013.01); *B32B 2307/554* (2013.01); *B32B 2413/00* (2013.01)

(58) Field of Classification Search
None
See application file for complete search history.

(56) References Cited

U.S. PATENT DOCUMENTS

| 4,395,298 A | 7/1983 | Wetzel et al. |
| 2010/0167860 A1 | 7/2010 | Mori et al. |
| 2010/0173740 A1 | 7/2010 | Mori et al. |

(Continued)

FOREIGN PATENT DOCUMENTS

| JP | H02-101721 U | 8/1990 |
| JP | 2003-191345 A | 7/2003 |
| JP | 2004-276559 A | 10/2004 |

(Continued)

*Primary Examiner* — Barbara J Musser
(74) *Attorney, Agent, or Firm* — Maschoff Brennan

(57) ABSTRACT

A surface sheet which is to constitute a surface layer and a core sheet which is to constitute a core layer are prepared. A plurality of ridges is formed on the core sheet, and the surface sheet is bonded such that the surface sheet covers the plurality of ridges, thereby forming compression layer-forming portions.

8 Claims, 23 Drawing Sheets

(56) References Cited

U.S. PATENT DOCUMENTS

2012/0071286 A1* 3/2012 Pasch .................... B29D 29/08
                                                                                      474/205
2014/0103562 A1    4/2014 Okubo et al.

FOREIGN PATENT DOCUMENTS

| JP | 2011-190916 A | 9/2011 |
|----|---------------|--------|
| JP | 5156881 B2 | 3/2013 |
| JP | 5717810 B2 | 5/2015 |
| WO | 2012/172717 A1 | 12/2012 |

* cited by examiner

Prior Art

METHOD FOR PRODUCING BELT, AND TWO-LAYER BONDING MACHINE

CROSS-REFERENCE TO RELATED APPLICATIONS

This is a continuation of International Application No. PCT/JP2017/000306 filed on Jan. 6, 2017, which claims priority to Japanese Patent Application No. 2016-069527 filed on Mar. 30, 2016. The entire disclosures of these applications are incorporated by reference herein.

BACKGROUND

The present disclosure relates to a method for producing a belt such as a V-ribbed belt, a raw edge V-belt, a cogged V-belt, and a toothed belt, and a two-layer bonding machine.

When an uncrosslinked rubber composition containing short fibers is extrusion molded into an uncrosslinked rubber sheet, the short fibers are insufficiently oriented in the uncrosslinked rubber sheet. It is therefore difficult to produce a V-ribbed belt which is inexpensive, unlikely to generate a noise, and has a high wear resistance by using the uncrosslinked rubber sheet. For this reason, in practice, an uncrosslinked rubber sheet for forming V-shaped ribs in which short fibers are oriented in the width direction is prepared in the following manner. An uncrosslinked rubber composition containing the short fibers blended therein is kneaded, and then rolled with a calender to form an uncrosslinked rubber sheet in which the short fibers are oriented in the length direction. Subsequently, the uncrosslinked rubber sheet is cut perpendicularly to the length direction at regular intervals into rubber pieces. The rubber pieces are joined together at its sides, thereby forming the uncrosslinked rubber sheet. However, this method requires use of expensive short fibers, and the orientation of the short fibers must be precisely controlled.

To address this problem, as disclosed in, for example, Japanese Patent No. 5156881, it has been known that an uncrosslinked rubber sheet for a compressed rubber layer is prepared by extrusion molding an uncrosslinked rubber composition which includes no short fibers but contains hollow particles and/or a foaming agent blended therein.

It has also been known to produce, by using a molding method, a V-ribbed belt having rib surfaces covered with canvas which is stretchable in two predetermined directions, wherein a belt matrix permeates through the texture of the canvas (see, for example, Japanese Patent No. 5717810). In this molding method, the rib surfaces press the canvas arranged on the outer periphery of the belt matrix and the belt matrix onto a mold provided on the inner peripheral surface of a shell, and the belt matrix is then crosslinked and molded.

SUMMARY

As described in Japanese Patent No. 5156881, it is effective in reducing the cost of a belt to form a surface rubber from an expensive rubber that has a low friction coefficient and is heat resistant, and form an inner rubber from an inexpensive pure rubber.

However, if a two-layer rubber is formed from flat sheets by using a mold or through two-color extrusion, as shown in FIG. 5B, a surface layer 512' in a compression layer-forming portion 511' has a nonuniform thickness. Specifically, the thickness t1 of a portion of the surface layer 512' in a groove between ridges 511a' significantly differs from the thickness t2 of a portion of the surface layer 512' on the top of the ridge 511a' (t2>t1). For example, t2 is 0.9 mm whereas t1 is 0.2 mm. Thus, the surface layer is made to have such a nonuniform thickness, bringing about a situation which is especially adverse to the performance of a belt: almost no surface rubber layer is formed at bottom portions of ribs. In this case, even a small amount of abrasion causes the inner rubber to be exposed and increases the coefficient of friction. Consequently, the belt generates a noise.

According to the molding method as disclosed in Japanese Patent No. 5717810, a flat unvulcanized rubber sheet having canvas layered on a surface thereof is pressed onto a mold having a shape corresponding to multiple ribs and heated. Therefore, the ribs are formed while the tip ends of ribs of the mold push the canvas layered on the unvulcanized rubber sheet to locally stretch the canvas and the unvulcanized rubber is forced to flow. As a result, portions of the canvas that correspond to the bottoms of the ribs (i.e., the tip ends of the ribs of the mold) and have been locally and excessively stretched are caused to have roughened texture. The flowing unvulcanized rubber enters the roughened texture to seep to the surface of the resultant belt. As a result, the belt has an excessively high coefficient of friction, and generates a noise.

To solve the above problems involved in the molding method, it is necessary to use special canvas which includes polyurethane elastic yarn and is significantly contracted in advance so that its texture is not allowed to be roughened considerably even when the canvas is locally stretched. However, such canvas, which has a very special structure, requires a large number of process steps and incurs a high cost. In addition, since the polyurethane elastic yarn used in the special canvas has a low heat resistance, the polyurethane suffers thermal degradation at an early stage in a situation where the belt is used in a high temperature environment, causing early abrasion of the belt. Thus, use of the special canvas causes problems with respect to both costs and durability.

In view of the foregoing background, it is therefore an object of the present disclosure to enable production of an inexpensive belt which is unlikely to generate a noise and has a high wear resistance without having to use expensive short fibers, by covering a compression layer with a surface layer while preventing the surface layer from stretching significantly.

To achieve the above object, the present disclosure is based on a method for producing a belt including a compression layer comprised of a surface layer and a core layer, the surface layer forming a surface portion of the belt, the core layer forming an inner portion, of the belt, having one or a plurality of ridges.

A method for producing the belt according to a first aspect of the disclosure includes:

preparing a surface sheet which is to constitute the surface layer and a core sheet which is to constitute the core layer (a preparation step);

forming the plurality of ridges on a surface of the core sheet (a ridge forming step); and bonding the surface sheet to the core sheet such that the surface sheet covers the surface of the core sheet having the ridges formed thereon, thereby forming a compression layer-forming portion (a boding step).

With this configuration, the surface sheet is shaped into a form corresponding to ridges (for example, a V-shape of the V-belt, a V-rib shape of the V-ribbed belt, a cog shape of a cogged belt, a tooth shape of a toothed belt). This allows the surface sheet to have significant room for stretch, and consequently, makes it less likely that the surface layer has nonuniform thickness. As a result, a situation which is adverse to the performance of the belt, i.e., the situation where almost no surface rubber layer is formed at bottom portions of ribs is substantially avoided. Hence, a situation where even a small amount of abrasion causes the inner rubber to be exposed and increases the coefficient of friction, and the belt generates a noise is substantially avoided, and the durability of the surface layer is ensured. In the case where the surface sheet is configured as the covering fabric, ridges that have been previously formed are covered with the covering fabric. Consequently, grooves between the ridges stretch the entire covering fabric, which can be freely stretched, and then, the covering fabric is bonded to the grooves between the ridges. This substantially prevents the covering fabric from being stretched locally only in the grooves between the ridges, enabling the covering fabric to be bonded while being stretched a little and uniformly. In addition, especially in the case where the rubber forming the core sheet is uncrosslinked, since the uncrosslinked rubber already has the ridges corresponding to the shape of ribs, almost no flow occurs in the uncrosslinked rubber when it is bonded. Thus, the rubber is substantially prevented from seeping through roughed texture of the covering fabric to the surface. Thus, a simply-configured and inexpensive fabric which has a small stretchability can be used as the covering fabric. Note that the surface sheet may be made of a rubber sheet or fabric material.

The bonding step may be carried out by passing the surface sheet and the core sheet between a core-shaping flat roll having a flat surface and a surface-shaping grooved roll having a plurality of trapezoidal grooves each of which corresponds to the ridge and which are arranged in an axial direction of the surface-shaping grooved roll, wherein the surface sheet is processed to have a shape corresponding to the ridges when being bonded to the core sheet (a surface deforming step). This allows the surface sheet to have significant room for stretch, and consequently, makes it possible to effectively prevent the surface sheet from stretching locally. Here, the surface sheet deforming step includes, for example, rolling or folding the surface sheet. For example, to prepare a surface sheet of rubber, a sheet-shaped rubber material is rolled and pressed into a gap between two grooved rolls. To prepare a surface sheet of canvas, the canvas is folded.

The ridge forming step may be carried out by passing the core sheet between the core-shaping flat roll and the core-shaping grooved roll having a plurality of trapezoidal grooves each of which corresponds to the ridge and which are arranged in an axial direction of the core-shaping grooved roll. With this configuration, the ridges can be formed on the core sheet in a simple manner.

The ridge forming step may be carried out by passing the core sheet through a through hole of a die, the through hole having a shape corresponding to the ridges. With this configuration, the ridges can be formed on the core sheet in a simple manner.

The surface sheet deforming step may be carried out by passing the surface sheet between the surface-shaping grooved roll and a surface-shaping ridged roll having a plurality of trapezoidal ridges which correspond to the grooves of the surface-shaping grooved roll and are arranged in an axial direction of the surface-shaping ridged roll. With this configuration, it is ensured that the surface sheet is deformed into a shape corresponding to the ridges when passing between the rolls. In other words, the surface rubber sheet or surface canvas which is to constitute the surface sheet is deformed in advance.

The surface sheet deforming step may be carried out by causing the surface sheet to run on the surface-shaping grooved roll, wherein the bonding the surface sheet to the core sheet is carried out while the surface sheet deformed into the shape corresponding to the ridges is placed over the surface of the core sheet. With this configuration, the surface sheet is deformed without using any roll operating in conjunction with the surface-shaping grooved roll. This configuration is especially effective for a highly stretchable fabric.

The surface sheet deforming step may be carried out by deforming the surface sheet into a pleated shape corresponding to the ridges. Specifically the surface sheet may be passed between a pair of pleating members one of which has ribs arranged to correspond to tops of the ridges and the other of which has ribs arranged to correspond to bottom of grooves between the ridges, and the bonding step is carried out while placing the surface sheet deformed into the pleated shape on the core sheet. This simple configuration can deform the surface sheet into a pleated shape corresponding to the ridges.

The ribs stand on the pair of the pleating member such that the intervals between the ribs gradually decrease downstream. In the surface sheet deforming step, the surface sheet which originally has a flat shape may be continuously passed between the pair of the pleating members so that pitches of the pleated shape gradually decreases in a length direction. In this way, the surface sheet is reliably folded into a pleated shape without causing wrinkles.

The surface sheet may be comprised of a covering fabric. This configuration can reduce seeping of the rubber and substantially prevent the belt from generating a noise.

The surface sheet may be comprised of a surface rubber sheet. This configuration makes it less likely that the surface rubber layer has a nonuniform thickness, and can ensure the durability of the surface rubber layer.

The method for producing belt of the present disclosure may further include: a step of forming a shaped structure by wrapping the core sheet having the surface sheet bonded thereon around a layered structure including a cord and rubber or a thermoplastic elastomer, the shaped structure having a cylindrical shape and including a plurality of ridges extending in a circumferential direction and arranged adjacent to each other in an axial direction of the shaped structure;

a step of crosslinking the shaped structure; and a finishing step in which the crosslinked shaped structure is cut into pieces each including at least one of the ridges. This configuration enables production of a highly marketable belt including ridges uniformly covered by the surface sheet, such as a V-ribbed belt, a raw edge V-belt, a cogged V-belt, and a toothed belt.

The present disclosure also relates to a two-layer bonding machine configured to bond a surface sheet which is to constitute a surface layer of a belt, and a core sheet which is to constitute a core layer forming an inner portion, of the belt, having one or a plurality of ridges. The two-layer bonding machine includes: a core-shaping flat roll having a flat surface and configured to press the core sheet; and a surface-shaping grooved roll having a plurality of trapezoidal grooves each of which corresponds to the ridge and which are arranged in an axial direction of the surface-shaping grooved roll, the surface-shaping grooved roll being configured to press the surface sheet, wherein the core-shaping flat roll and the surface-shaping grooved roll are capable of being heated to different temperatures. The two-layer bonding machine may further include a core-shaping grooved roll having a plurality of trapezoidal grooves each of which corresponds to the ridge and which are arranged in an axial direction of the core-shaping grooved roll. The two-layer bonding machine may further include a die including a through hole having a shape corresponding to the ridges. Alternatively, the two-layer bonding machine may further include a pair of pleating members one of which has a plurality of ribs arranged to correspond to tops of the ridges and the other of which has a plurality of ribs arranged to correspond to bottom of grooves between the ridges.

The present disclosure enables production of an inexpensive belt which is unlikely to generate a noise and has a high wear resistance without having to use expensive short fibers, by covering a compression layer with a surface layer while preventing the surface layer from stretching significantly.

DETAILED DESCRIPTION

Embodiments will be described in detail below with reference to the drawings.

Figure 1:
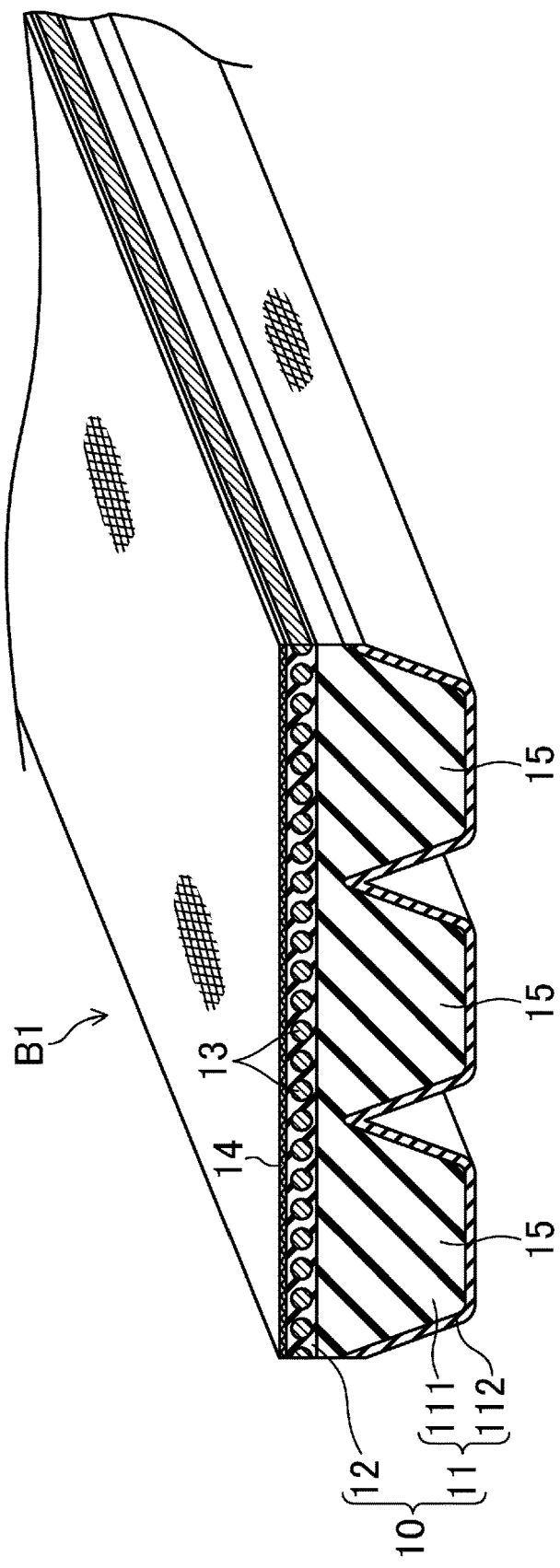
FIG. 1 is a perspective view of a V-ribbed belt produced by a first production method according to an embodiment.

FIG. 1 shows a V-ribbed belt B1 which is an example of belts produced by a production method according to an embodiment. The V-ribbed belt B1 is usable as a power transmission member for various machines. For example, the V-ribbed belt B1 has a length of 700 mm to 3000 mm, a width of 10 mm to 36 mm, and a thickness of 4.0 mm to 5.0 mm.

The V-ribbed belt B1 of this embodiment is comprised of a rubber-made belt body 10 including a compression layer 11 which forms an inner peripheral portion of the belt B1 and an adhesive rubber layer 12 which forms an outer peripheral portion of the belt B1. The inner and outer peripheral portions face each other in the thickness direction of the belt B1. The compression layer 11 includes a core rubber layer 111 which functions as a core layer and has a plurality of ridges formed on a surface thereof, and a surface rubber layer 112 which functions as a surface layer and covers the surface of the core rubber layer 111. The core rubber layer 111 and the surface rubber layer 112 form a plurality of V-shaped ribs 15 which extend in the longitudinal direction on the inner peripheral side of the belt in the thickness direction and are arranged side-by-side in the belt width direction. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer peripheral side of the adhesive rubber layer 12, i.e., the back face of the belt. Note that the V-ribbed belt B1 may include a stretch rubber layer instead of the reinforcing fabric 14. Thus, the rubber-made belt body may include the compression layer, the adhesive rubber layer, and the stretch rubber layer. However, the adhesive rubber layer may be omitted. In this case, the belt has a structure in which the cord is sandwiched between the core rubber layer and the stretch rubber layer.

The compression layer 11 has the plurality of V-shaped ribs 15 that form a pulley contacting portion and protrude away from the outer peripheral side of the belt. The plurality of V-shaped ribs 15 are each in the shape of a ridge extending in the belt length direction and having an approximately inverted triangular cross-section. The V-shaped ribs 15 are arranged parallel to one another in the belt width direction. Each V-shaped rib 15 has, for example, a height of 2.0 mm to 3.0 mm, and a width of 1.0 mm to 3.6 mm at its base end. The number of the ribs ranges, for example, from 3 to 6 (3 ribs in FIG. 1).

The surface rubber layer 112 and the core rubber layer 111 are made of different crosslinked rubber compositions, each of which is produced by crosslinking, through heating and pressurization, an uncrosslinked rubber composition prepared by kneading a rubber component and various compound ingredients together. Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be blended with the rubber composition forming the surface rubber layer 112 include surface texture modifiers such as short fibers, fluororesin powder, polyethylene resin powder, hollow particles, and a foaming agent.

The cord 13 is made of a twisted yarn of fibers, such as polyester fibers, polyethylene naphthalate fibers, aramid fibers, and vinylon fibers. The reinforcing fabric 14 is comprised of a woven, knitted, or unwoven fabric made of nylon fibers, polyester fibers, aramid fibers, or cotton, for example.

<First Production Method>

A first production method of the V-ribbed belt B1 according to the embodiment will be described with reference to FIGS. 2 to 9.

The first production method includes a component preparation step, a shaping step, a crosslinking step, and a finishing step.

<Component Preparation Step>

In the component preparation step, a surface rubber sheet 112' as a surface sheet to constitute the surface rubber layer 112, a core rubber sheet 111' as a core sheet to constitute the core rubber layer 111, an adhesive rubber sheet 12' to constitute the adhesive rubber layer 12, a cord 13', and a reinforcing fabric 14' are prepared.

—Surface Rubber Sheet 112'—

A rubber component and compound ingredients are kneaded together by using a kneading machine such as a kneader or a Banbury mixer to obtain an uncrosslinked rubber composition. The uncrosslinked rubber composition is molded by calender molding, extrusion, or the like, into a sheet, i.e., an uncrosslinked rubber sheet 112", from which the surface rubber sheet 112' is prepared. For example, the thickness of the surface rubber sheet 112' varies depending on the thickness of a layer to be bonded to the surfaces of the V-shaped ribs 15, and is within the range from 0.5 mm to 2 mm. Powder or short fibers may be previously attached to a surface, of the surface rubber sheet 112', which is to constitute a surface of the belt.

—Core Rubber Sheet 111'—

A rubber component and compound ingredients are kneaded together by using a kneading machine such as a kneader or a Banbury mixer to obtain an uncrosslinked rubber composition. The uncrosslinked rubber composition is molded by calender molding, extrusion, or the like, into a thick uncrosslinked rubber sheet 111". The core rubber sheet 111' is then produced from the uncrosslinked rubber sheet 111". For example, the uncrosslinked rubber sheet 111" in a flat state has a thickness of 3 mm to 5 mm.

Figure 2:
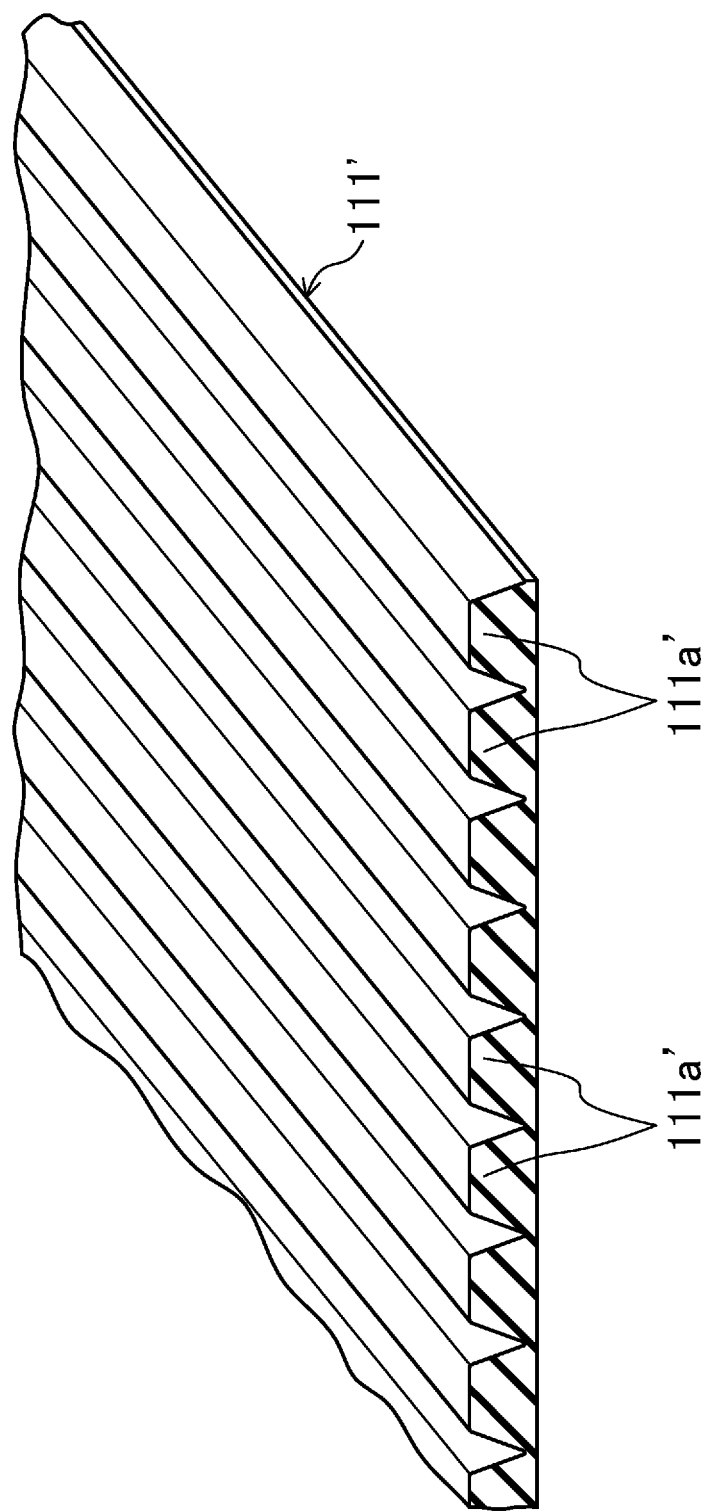
FIG. 2 is a perspective view of a core rubber sheet for use in the first production method.

As shown in FIG. 2, the core rubber sheet 111' has, on one surface, a plurality of core rubber layer-forming portions 111a' which are each comprised of a linearly-extending ridge and which extend parallel to, and adjacent to, each other. The core rubber layer-forming portions 111a' have the same shape. Each core rubber layer-forming portion 111a' has a width decreasing toward its distal end. Specifically, each core rubber layer-forming portion 111a' is shaped to have a cross section in an isosceles trapezoidal shape by a two-layer bonding machine 20 which will be described later.

—Adhesive Rubber Sheet 12'—

A rubber component and compound ingredients are kneaded together by using a kneading machine such as kneader or a Banbury mixer to obtain an uncrosslinked rubber composition. The uncrosslinked rubber composition is molded by calender molding or the like, into a sheet, i.e., the adhesive rubber sheet 12'.

—Cord 13'—

A twisted yarn to constitute a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

—Reinforcing Fabric 14—

A woven fabric or a fabric of any other type which is to constitute a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric to face the belt body 10 and dried. The fabric may undergo, prior to these adhesion treatments, a base treatment in which the fabric is soaked in an epoxy resin solution or an isocyanate resin solution and heated. In the case where a stretch rubber layer is provided instead of the reinforcing fabric 14, a stretch rubber sheet to constitute the stretch rubber layer is prepared in a manner similar to that for the adhesive rubber sheet 12'.

<Shaping Step>

Figure 3:
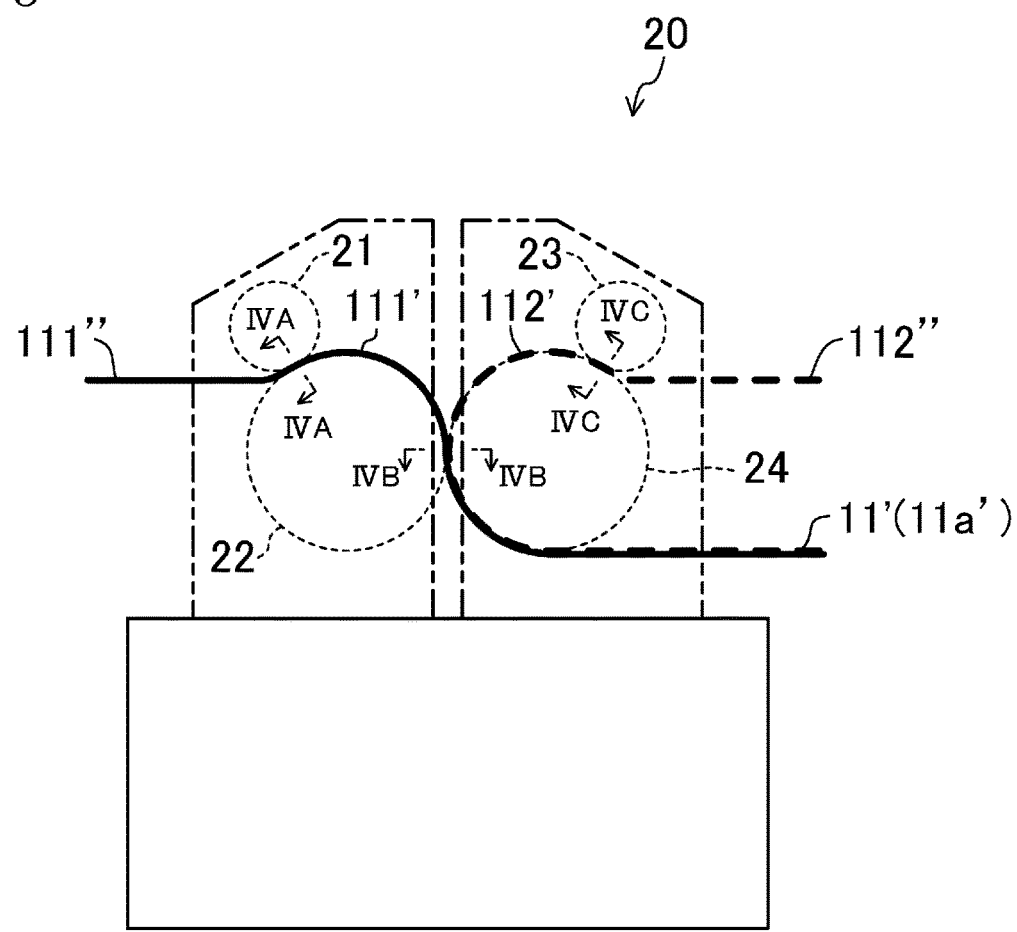
FIG. 3 is a front view schematically showing a two-layer bonding machine for use in the first production method.

In the shaping step, a two-layer bonding machine 20 shown in, for example, FIG. 3 is used to cover the core rubber sheet 111' with the surface rubber sheet 112' in advance, thereby forming a compressed rubber sheet 11a' including the core rubber sheet 111' covered with the surface rubber sheet 112', while forming compression layer-forming portions 11' including the core rubber layer-forming portions 111a' covered with the surface rubber sheet 112'. Covering the core rubber sheet 111' with the surface rubber sheet 112' in advance reduces stretch of the surface rubber sheet 112', enabling production of the V-ribbed belt B1 including a surface rubber layer 112 having a substantially uniform thickness.

Specifically, as schematically shown in FIG. 3 and FIGS. 4A to 4C, the two-layer bonding machine 20 of this embodiment includes, for example, four rolls, namely: a core rubber-shaping grooved roll 21 having a plurality of trapezoidal grooves 21a corresponding to ridges and arranged in the axial direction of the core rubber-shaping grooved roll 21; a core rubber-shaping flat roll 22 having a flat surface; a surface-shaping ridged roll 23 having a plurality of trapezoidal ridges 23a corresponding to the ridges and arranged in the axial direction of the surface-shaping ridged roll 23; and a surface-shaping grooved roll 24 having a plurality of trapezoidal grooves 24a having a shape corresponding to the trapezoidal ridge 23a of the surface-shaping ridged roll 23 (the compression layer-forming portion 11'). The trapezoidal groove 21a is more rounded than the trapezoidal groove 24a. It is desirable that these four rolls 21 to 24 be capable of being heated to different temperatures and their rotational speeds be variable independently. For example, the core rubber-shaping flat roll 22 is heated to 90° C., and the other rolls 21, 23 and 24 are heated to 60° C. The temperature of each of the rolls 21 to 24 is set in view of a balance between sufficient shaping of the material by heating and the separability of the material from the respective roll (adhesiveness of the material to the respective roll). In this embodiment, the temperature of the core rubber-shaping flat roll 22 is somewhat higher than those of the other rolls in view of the balance between the shaping and the separability. This makes it easy for the core rubber sheet 111' to adhere to the core rubber-shaping flat roll 22.

For example, a gap G1 between the core rubber-shaping grooved roll 21 and the core rubber-shaping flat roll 22 is 0.25 mm, a gap G3 between the surface-shaping ridged roll 23 and the surface-shaping grooved roll 24 is 0.05 mm, and a gap G2 between the core rubber-shaping flat roll 22 and the surface-shaping grooved roll 24 is 0.1 mm. It is desirable that the gaps G1 to G3 can also be adjusted independently.

The uncrosslinked rubber sheets 111" and 112" are soft and easily deformed in an uncrosslinked state.

Figure 4A:
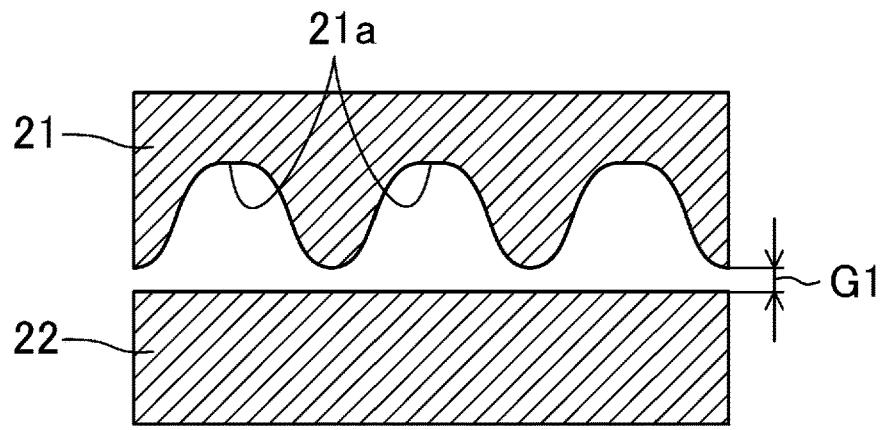
FIG. 4A is a cross-sectional view taken along line IVA-IVA of FIG. 3.

As shown in FIGS. 3 and 4A, the core rubber sheet 111' is formed in a ridge forming step. Specifically, the uncrosslinked rubber sheet 111" is passed between the core rubber-shaping flat roll 22 and the core rubber-shaping grooved roll 21 having the trapezoidal grooves 21a that have a shape corresponding to the core rubber layer-forming portions 111a' of the core rubber sheet 111', extend in the circumferential direction, and are arranged adjacent to each other in the axial direction. The trapezoidal grooves 21a on the outer peripheral surface of the core rubber-shaping grooved roll 21 are pressed onto one surface of the uncrosslinked rubber sheet 111", thereby forming the core rubber layer-forming portions 111a' including many ridges. In this manner, the core rubber sheet 111' can be prepared. Since each of the trapezoidal grooves 21a has a relatively rounded trapezoidal shape, the uncrosslinked rubber sheet 111" is deformed in conformity with the shape of trapezoidal grooves 21a. Thus, the number of the formed core rubber layer-forming portions 111a' is the same as the number of the trapezoidal grooves 21a. As described above, the temperature of the core rubber-shaping flat roll 22 may be set to, for example, 90° C. so as to heat the uncrosslinked rubber sheet 111" and increase the plasticity of the uncrosslinked rubber sheet 111". The core rubber sheet 111' can also be prepared by press molding or extrusion molding which will be described later.

Figure 4B:
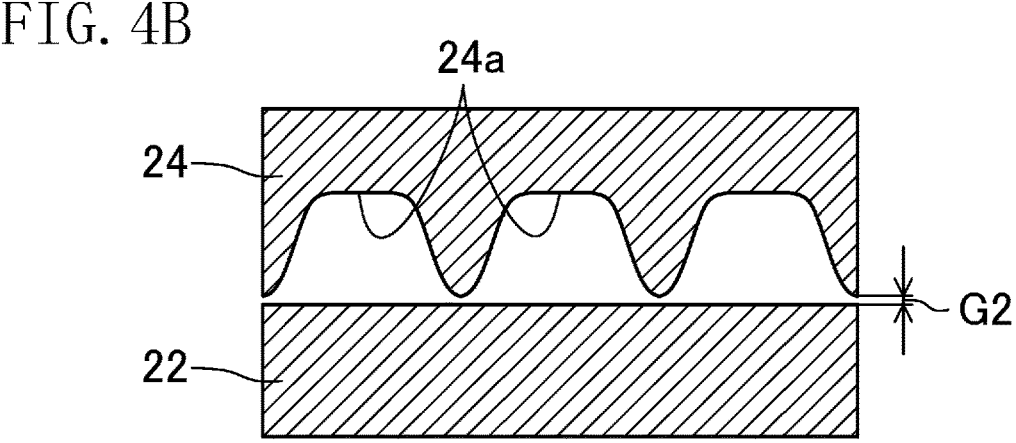
FIG. 4B is a cross-sectional view taken along line IVB-IVB of FIG. 3.
Figure 4C:
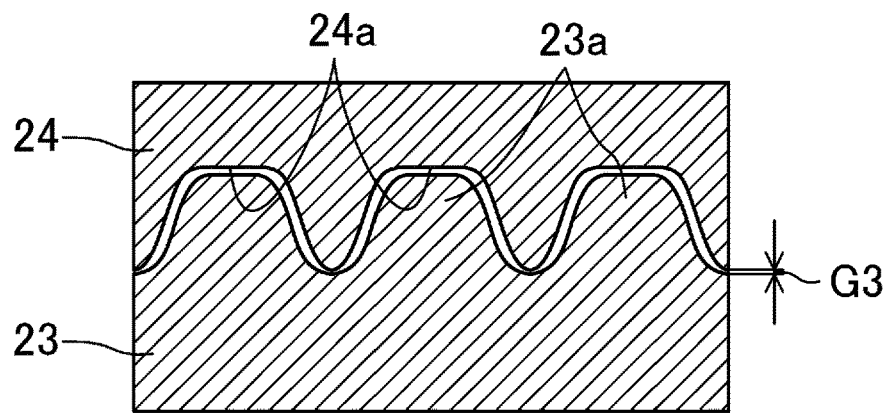
FIG. 4C is a cross-sectional view taken along line IVC-IVC of FIG. 3.

On the other hand, as shown in FIG. 4C, in a surface sheet deforming step, when passing between the surface-shaping ridged roll 23 and the surface-shaping grooved roll 24, the uncrosslinked rubber sheet 112" is shaped in conformity with the shape of the gap G3 between the trapezoidal ridges 23a and the trapezoidal grooves 24a. The uncrosslinked rubber sheet 112" is thus made to have a certain thickness and pressed onto the trapezoidal grooves 24a of the roll 24. The number of thus-formed grooves is the same as the number of the trapezoidal ridges 23a (the trapezoidal grooves 24a). For example, if the thickness of the uncrosslinked rubber sheet 112" is 1 mm to 2 mm and the roll gap G3 is 0.2 mm, the sheet is made to have a thickness of 0.4 mm and pressed onto the trapezoidal grooves 24a after passing through the gap G3.

Figure 5A:
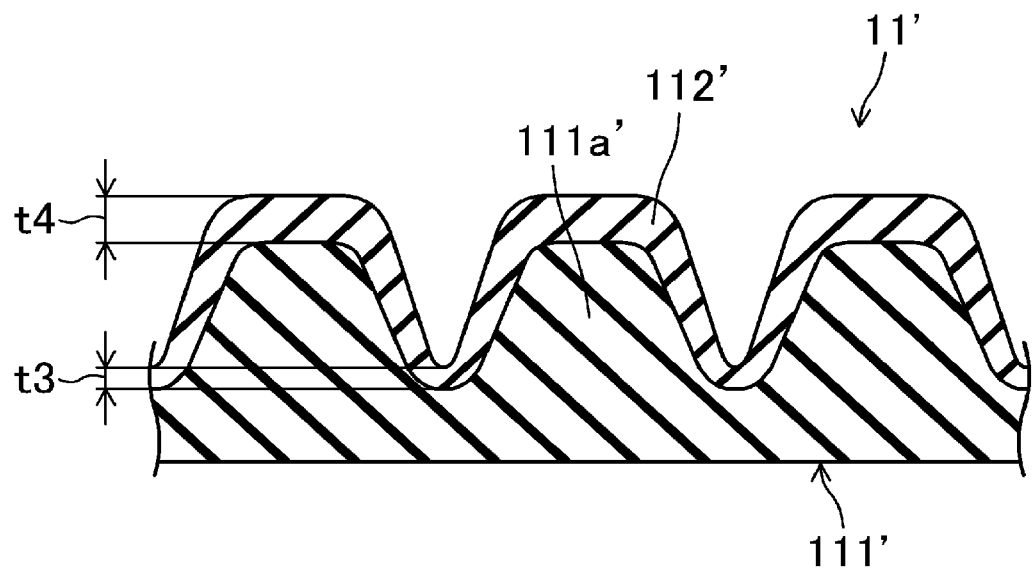
FIG. 5A shows, on an enlarged scale, a cross section of sheets bonded together by the two-layer bonding machine.
Figure 5B:
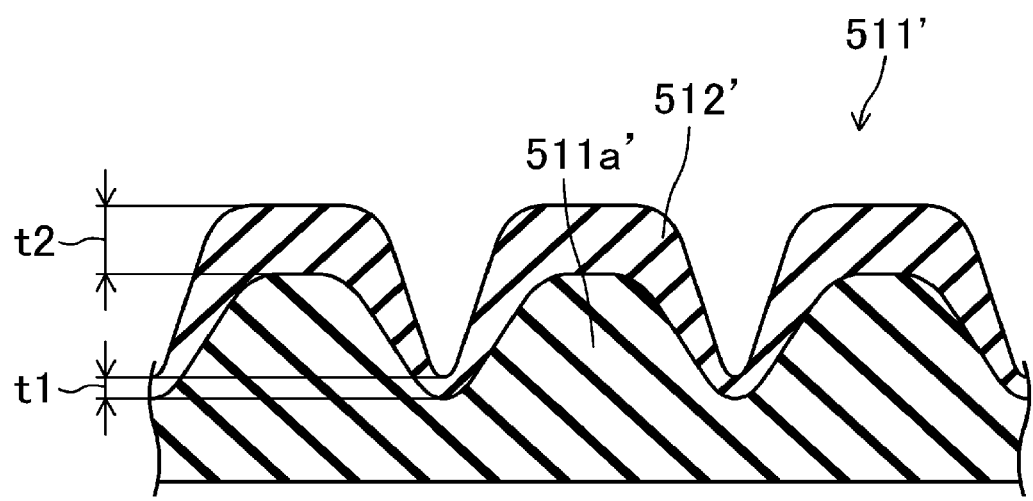
FIG. 5B shows, on an enlarged scale, a cross section of a product produced by known two-layer co-extrusion.

Subsequently, as shown in FIG. 4B, in a bonding step, when passing between the core rubber-shaping flat roll 22 and the surface-shaping grooved roll 24, the rubber sheets 111' and 112' are compressed suitably and formed into a compressed rubber sheet 11a' having a two-layer structure in the shape in conformity with the trapezoidal grooves 24a. By adjusting the gaps G1 to G3 and the rotational speeds of the rolls, even after the bonding of the surface rubber sheet 112' to the core rubber sheet 111', the surface rubber sheet 112' is allowed to have as small variation as possible in the thickness, as shown in FIG. 5A as an example. Specifically, the difference between a thickness t3 of a portion in a groove between the ridges and a thickness t4 of another portion on the top of the ridge is minimized. For example, it has been confirmed that t4 was 0.5 mm while t3 was 0.4 mm in an example. FIG. 5B shows a structure produced by a known two-layer co-extrusion, or by forcibly shaping a two-layer sheet, which is comprised of a smooth core rubber sheet and a smooth surface rubber sheet previously stacked together, with rolls respectively equivalent to the core rubber-shaping flat roll 22 and the surface-shaping grooved roll 24. A comparison shows that this embodiment clearly differs from the known technique (wherein t2=0.9 mm and t1=0.2 mm).

Covering the surface of the core rubber sheet 111' (the surfaces of the core rubber layer-forming portions 111a') with the surface rubber sheet 112' in advance, and prior to this covering process, shaping the surface rubber sheet 112' into a shape in conformity with the surfaces of the core rubber layer-forming portions 111a' make it possible to reduce stretch of the surface rubber sheet 112' to a small amount, enabling production of the V-ribbed belt B1 including the surface rubber layer 112 having a substantially uniform thickness. As a result, a situation which is adverse to the performance of the belt, i.e., the situation where almost no surface rubber layer 112 is formed at bottom portions of the ribs is substantially avoided. This makes it possible to substantially avoid an adverse situation where even a small amount of abrasion causes the inner rubber to be exposed and increases the coefficient of friction, and the belt generates a noise.

The core rubber-shaping grooved roll 21 shapes the uncrosslinked rubber sheet 111" into the core rubber sheet 111', while the surface-shaping ridged roll 23 and the surface-shaping grooved roll 24 make the uncrosslinked rubber sheet 112" fit the surface-shaping grooved roll 24. The surface rubber sheet 112' on the surface-shaping grooved roll 24 is then bonded to the core rubber sheet 111'. It is preferable that in this manner, the compressed rubber sheet 11a' is continuously produced from the uncrosslinked rubber sheet 111" and the uncrosslinked rubber sheet 112".

In the first production method, the resultant core rubber sheet 111' covered with the surface rubber sheet 112' may be wrapped around the adhesive rubber sheet 12' to prepare an uncrosslinked slab S'.

Figure 6A:
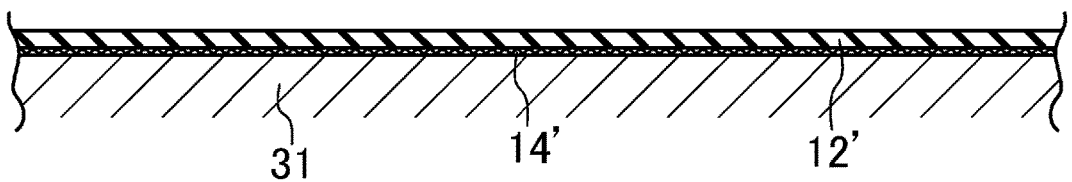
FIG. 6A is a first drawing showing a shaping step of the first production method.

In the shaping step, first, a shaping mandrel 31 having a cylindrical shape is rotatably supported on a shaft of a shaping machine (not shown) such that the axis of the shaping mandrel 31 extends horizontally. As shown in FIG. 6A, a reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the V-ribbed belt B1 to be produced. At this time, the adhesive rubber sheet 12' is stacked on the reinforcing fabric 14'. Each of the reinforcing fabric 14' and the adhesive rubber sheet 12' is cut with ultrasound, a cutter, scissors, or the like, and its ends are butt jointed or lap jointed together. A reinforcing fabric 14' having a predetermined length may be formed into a cylindrical shape through joining of its both ends, and this cylindrical reinforcing fabric 14' may be fitted over the shaping mandrel 31. Alternatively, a reinforcing fabric 14' and an adhesive rubber sheet 12' may be stacked on and integrated with each other into a layered structure, and then, this layered structure may be wrapped around the shaping mandrel 31. Alternatively, the layered structure having a predetermined length may be formed into a cylindrical shape through joining of its both ends such that the adhesive rubber sheet 12' faces outside, and the resultant cylindrical structure may be fitted over the shaping mandrel 31. In the case of providing a stretch rubber layer, the stretch rubber sheet is used instead of the reinforcing fabric 14', and the shaping step is carried out in a similar manner. In this shaping step, it is not necessary to provide an adhesive layer in which the reinforcing fabric 14' and the adhesive rubber sheet 12' are stacked and integrated together. In that case, a tensile member 38 has a cylindrical shape and includes the stretch rubber sheet on which the cord is helically wound.

Figure 6B:
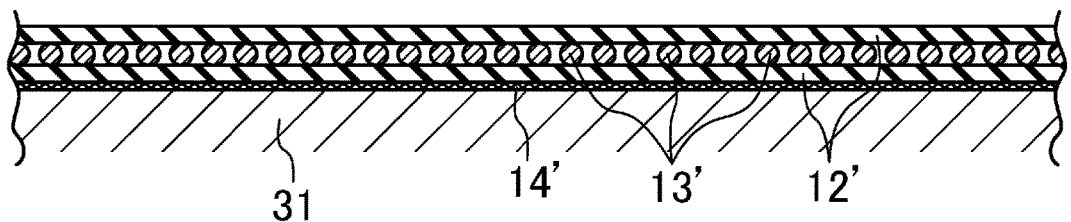
FIG. 6B is a second drawing showing the shaping step of the first production method.

Subsequently, as shown in FIG. 6B, a cord 13' is helically wound around the adhesive rubber sheet 12'. Another adhesive rubber sheet 12' is then wrapped over the wound cord 13'. At this time, a layer of the cord 13' is stacked on the adhesive rubber sheet 12', and the other adhesive rubber sheet 12' is stacked on the layer of the cord 13'. Each adhesive rubber sheet 12' is cut with ultrasound, a cutter, scissors, or the like, and its ends are butt jointed or lap jointed together.

Figure 6C:
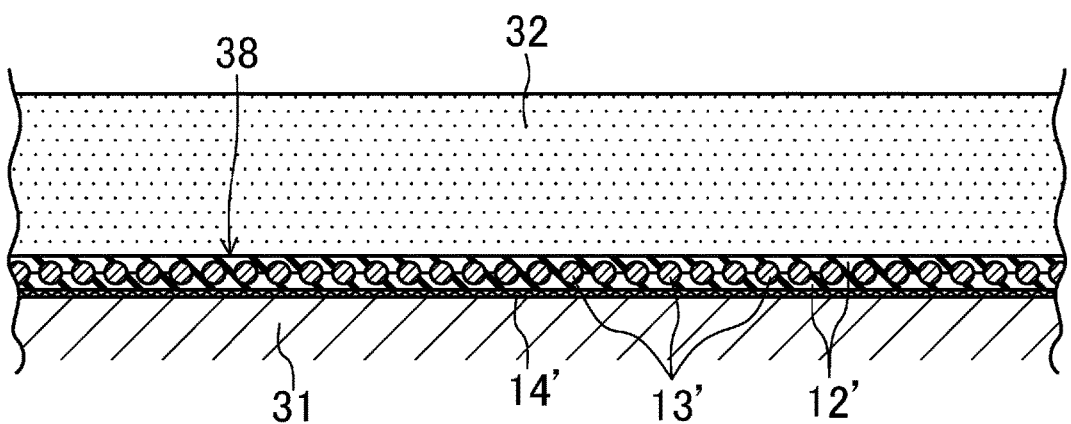
FIG. 6C is a third drawing showing the shaping step of the first production method.

Next, as shown in FIG. 6C, the entire periphery of the adhesive rubber sheet 12' is pressed with a roller 32. At this time, the rubber flows between turns of the cord 13', and the cord 13' is embedded between the pair of adhesive rubber sheets 12' so as to be fixed in position. As a result, these components are all integrated into the cylindrical tensile member 38. This operation may be carried out simultaneously with wrapping the adhesive rubber sheet 12' around the layer of the cord 13'.

Figure 6D:
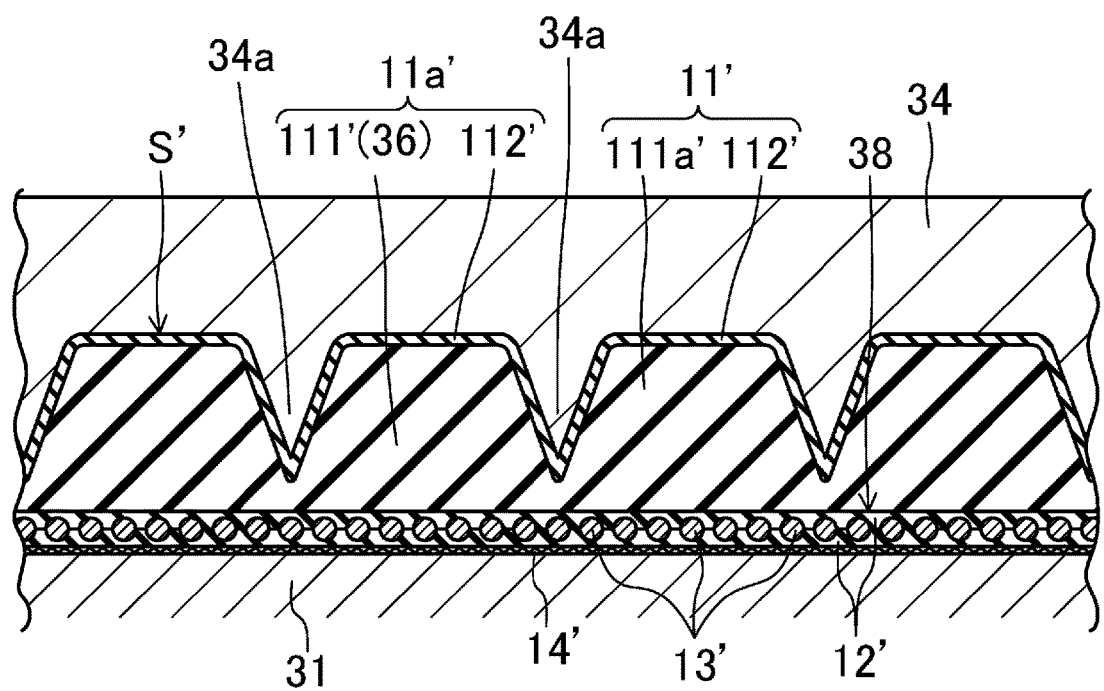
FIG. 6D is a fourth drawing showing the shaping step of the first production method.

Subsequently, the compressed rubber sheet 11a' formed in the bonding step is used. As shown in FIG. 6D, the compressed rubber sheet 11a' is wrapped around the adhesive rubber sheet 12' of the tensile member 38 such that the surface rubber sheet 112' faces outside and extends in the circumferential direction. At this time, a roll-shaped guide 34 having a shape corresponding to the shape of the surface of the compressed rubber sheet 11a' covered with the surface rubber sheet 112' is set such that the guide 34 extends in the axial direction and comb teeth 34a of the guide 34 face the shaping mandrel 31. The core rubber layer-forming portions 111a' of the compressed rubber sheet 11a' are guided between adjacent ones of the comb teeth 34a, and the compressed rubber sheet 11a' is wrapped around, and stacked on, the adhesive rubber sheet 12' with the core rubber layer-forming portions 111a' extending in the circumferential direction with precision. The compressed rubber sheet 11a' is cut with ultrasound, a cutter, scissors, or the like, and its ends are butt jointed. To increase the joint strength, the butt joint is preferably achieved by abutting surfaces, of the compressed rubber sheet 11a', which are oblique with respect to the thickness direction of the compressed rubber sheet 11a'. A compressed rubber sheet 11a' having a predetermined length may be formed into a cylindrical shape with its both end joined together such that the surface rubber sheet 112' faces outside, and this cylindrical compressed rubber sheet 11a' may be fitted over the adhesive rubber sheet 12'.

Covering the surface of the core rubber sheet 111' with the surface rubber sheet 112' in advance in this manner can reduce stretch of the surface rubber sheet 112' to a small amount, enabling production of the V-ribbed belt B1 including the surface rubber layer 112 having a substantially uniform thickness.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the surface rubber sheet 112' that are sequentially stacked toward the outside. The uncrosslinked slab S' includes the core rubber sheet 111' formed into a cylindrical shape, i.e., a shaped structure 36 which has a cylindrical shape. The shaped structure 36 is made of the uncrosslinked rubber composition and has, on its outer peripheral surface, the core rubber layer-forming portions 111a' that are comprised of the plurality of ridges extending in the circumferential direction and that are arranged adjacent to each other in the axial direction. In the uncrosslinked slab S', the core rubber sheet 111' and the surface rubber sheet 112' covering the core rubber sheet 111' together form the compressed rubber sheet 11a'. Further, the core rubber layer-forming portions 111a' and the surface rubber sheet 112' made of the uncrosslinked rubber composition and covering the core rubber layer-forming portions 111a' together form the compression layer-forming portions 11'. The number of the compression layer-forming portions 11' included in the uncrosslinked slab S' is 1 to 280, for example. In the case where the adhesive layer is omitted, the uncrosslinked slab S' has a cylindrical structure in which the reinforcing fabric 14', the cord 13', the core rubber sheet 111', and the surface rubber sheet 112' are sequentially stacked toward the outside.

<Crosslinking Step>

Figure 7A:
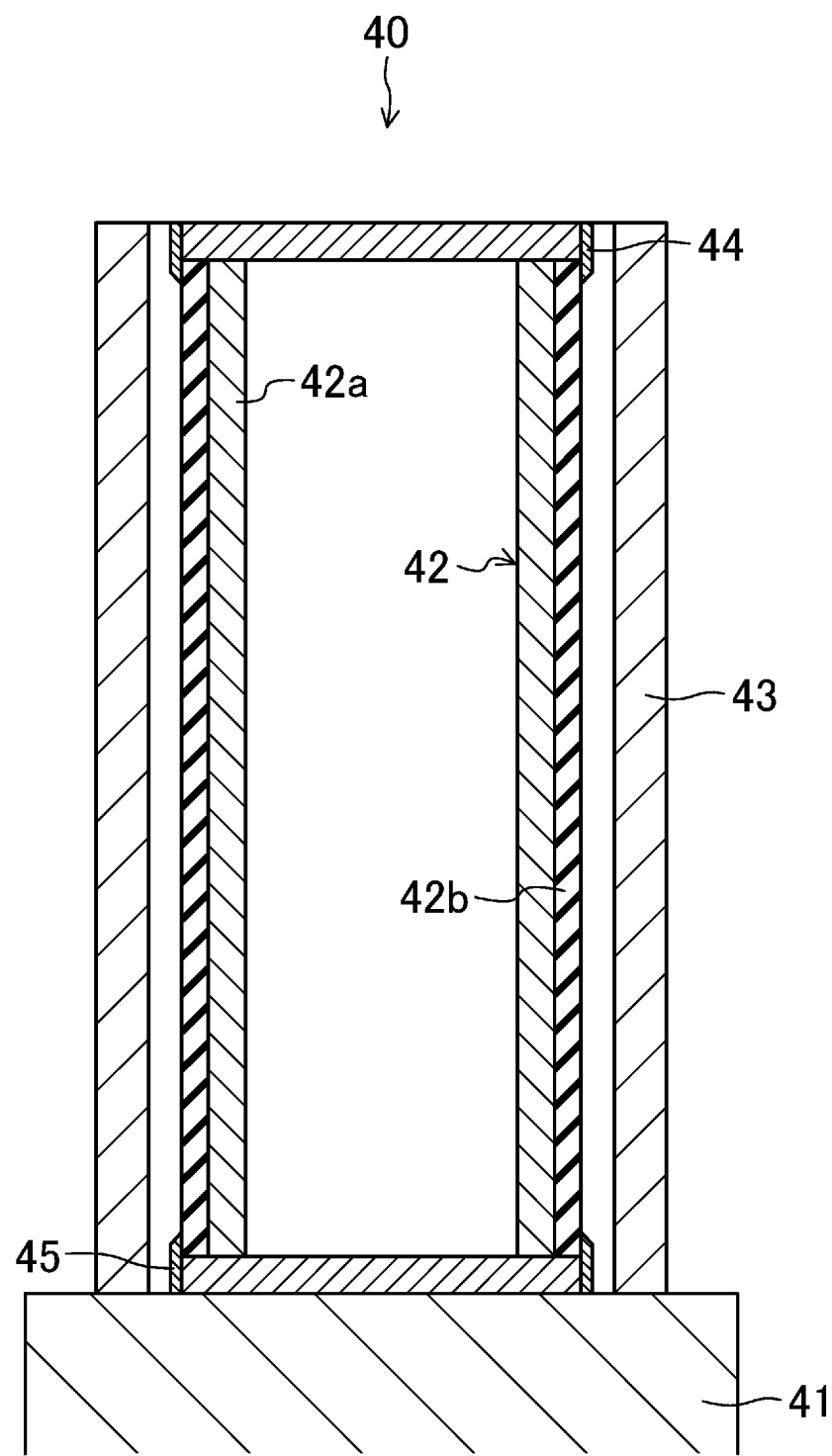
FIG. 7A is a cross-sectional view of a crosslinking apparatus.
Figure 7B:
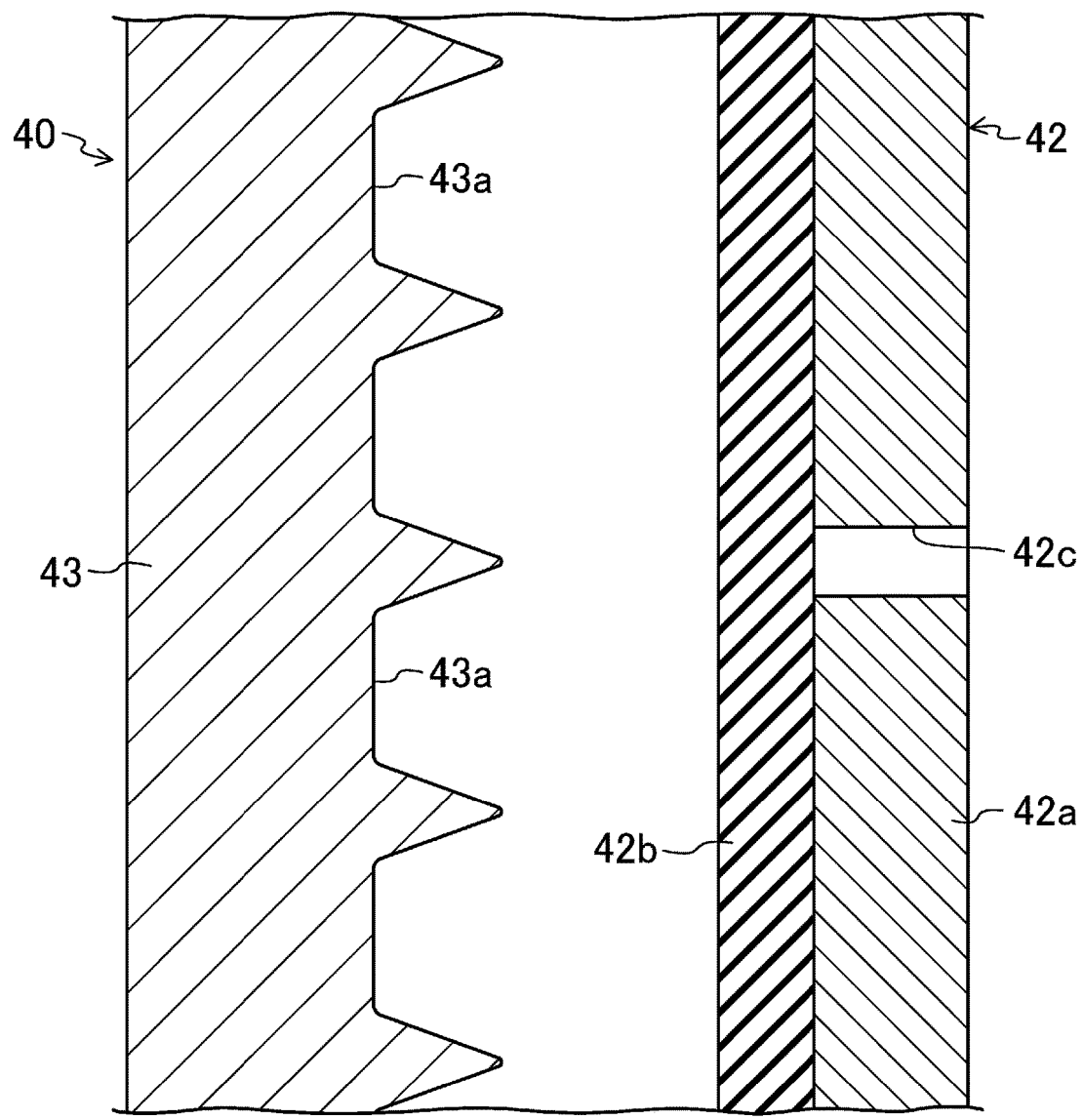
FIG. 7B shows, on an enlarged scale, a cross section of a portion of the crosslinking apparatus.

FIGS. 7A and 7B illustrate a crosslinking apparatus 40 for use in a crosslinking step.

The crosslinking apparatus 40 includes a base 41, a columnar expansion drum 42 standing on the base 41, a cylindrical mold 43 (belt mold) provided outside the expansion drum 42, and fixing rings 44 and 45 provided respectively on the top and the bottom of the expansion drum 42.

The expansion drum 42 includes a drum body 42a having a hollow columnar shape, and a cylindrical expansion sleeve 42b made of rubber and externally fitted over the outer periphery of the drum body 42a. The drum body 42a has, in its peripheral wall, a large number of air-passage holes 42c communicating with the inside. A space between the expansion sleeve 42b and the drum body 42a is sealed by the fixing rings 44 and 45 at both ends of the expansion sleeve 42b expansion sleeve 42b. The crosslinking apparatus 40 includes a pressurizing means (not shown) for applying a pressure by introducing high-pressure air into the drum body 42a. The high-pressure air introduced into the drum body 42a by the pressurizing means passes through the air-passage holes 42d to enter the space between the drum body 42a and the expansion sleeve 42b, and inflates the expansion sleeve 42b radially outward.

The cylindrical mold 43 is attachable to, and detachable from, the base 41. The cylindrical mold 43 is attached to the base 41 such that the cylindrical mold 43 and the expansion drum 42 are arranged concentrically with each other with a space interposed therebetween. The cylindrical mold 43 has, on its inner peripheral surface, a plurality of compression layer-shaping grooves 43*a* which extend in the circumferential direction and are arranged adjacent to each other in the axial direction. Each compression layer-shaping groove 43*a* tapers toward its groove bottom. Specifically, each compression layer-shaping groove 43*a* has the same isosceles trapezoidal cross section as the core rubber layer 111 of the V-ribbed belt B1 to be produced. The crosslinking apparatus 40 includes a heating means and a cooling means (both are not shown) for the cylindrical mold 43, so that the temperature of the cylindrical mold 43 can be controlled by these heating and cooling means.

First, the uncrosslinked slab S' is removed from the shaping mandrel 31, and then, placed inside the cylindrical mold 43 of the crosslinking apparatus 40, which has been previously detached from the base 41. More specifically, the uncrosslinked slab S' is set inside the cylindrical mold 43 such that each of the plurality of compression layer-forming portions 11' of the uncrosslinked slab S' (the core rubber layer-forming portions 111*a*' covered with the surface rubber sheet 112') is fitted in an associated one of the compression layer-shaping grooves 43*a*. Fitting the compression layer-forming portions 11' in the compression layer-shaping grooves 43*a* in advance reduces stretch of the rubber, thereby enabling the production of the V-ribbed belt B1 having a stable structure. At this time, the shaped structure 36 and the surface rubber sheet 112' are set inside the cylindrical mold 43 such that the shaped structure 36 and the surface rubber sheet 112' are positioned respectively inside and outside with respect to each other. The cylindrical mold 43 is chosen to correspond to the length of the V-ribbed belt B1 to be produced. Note that short fibers, resin powder, or the like may be attached to the inner peripheral surface of the cylindrical mold 43 and/or the outer peripheral surface of the uncrosslinked slab S' in advance.

Figure 8A:
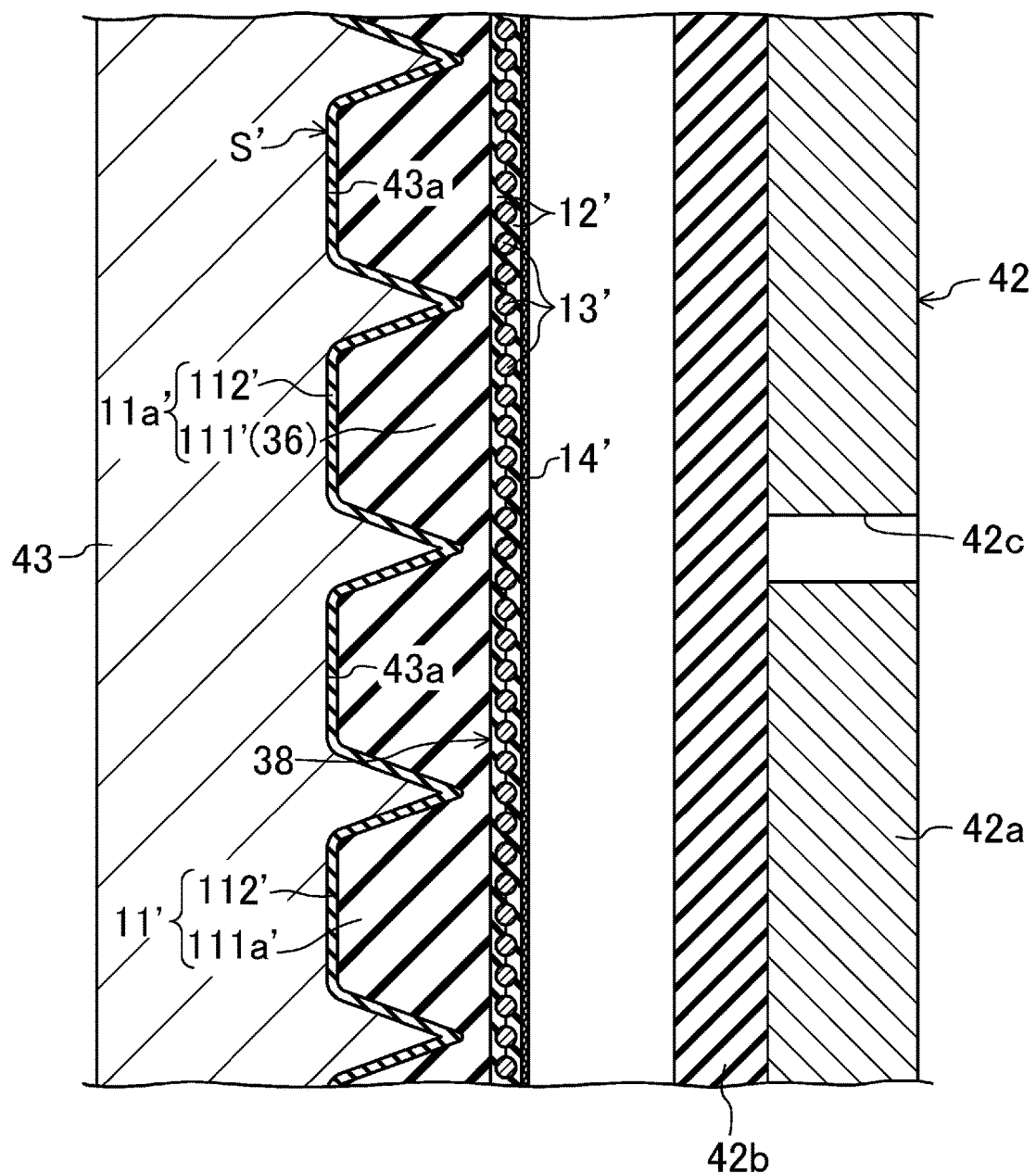
FIG. 8A is a first drawing showing a crosslinking step of the first production method.

Subsequently, as shown FIG. 8A, the cylindrical mold 43 within which the uncrosslinked slab S' has been set is attached to the base 41 such that the cylindrical mold 43 covers the expansion drum 42. At this time, a gap is formed between the uncrosslinked slab S' set in the cylindrical mold 43 and the expansion drum 42, and the inner space of the cylindrical mold 43 is hermitically sealed.

Figure 8B:
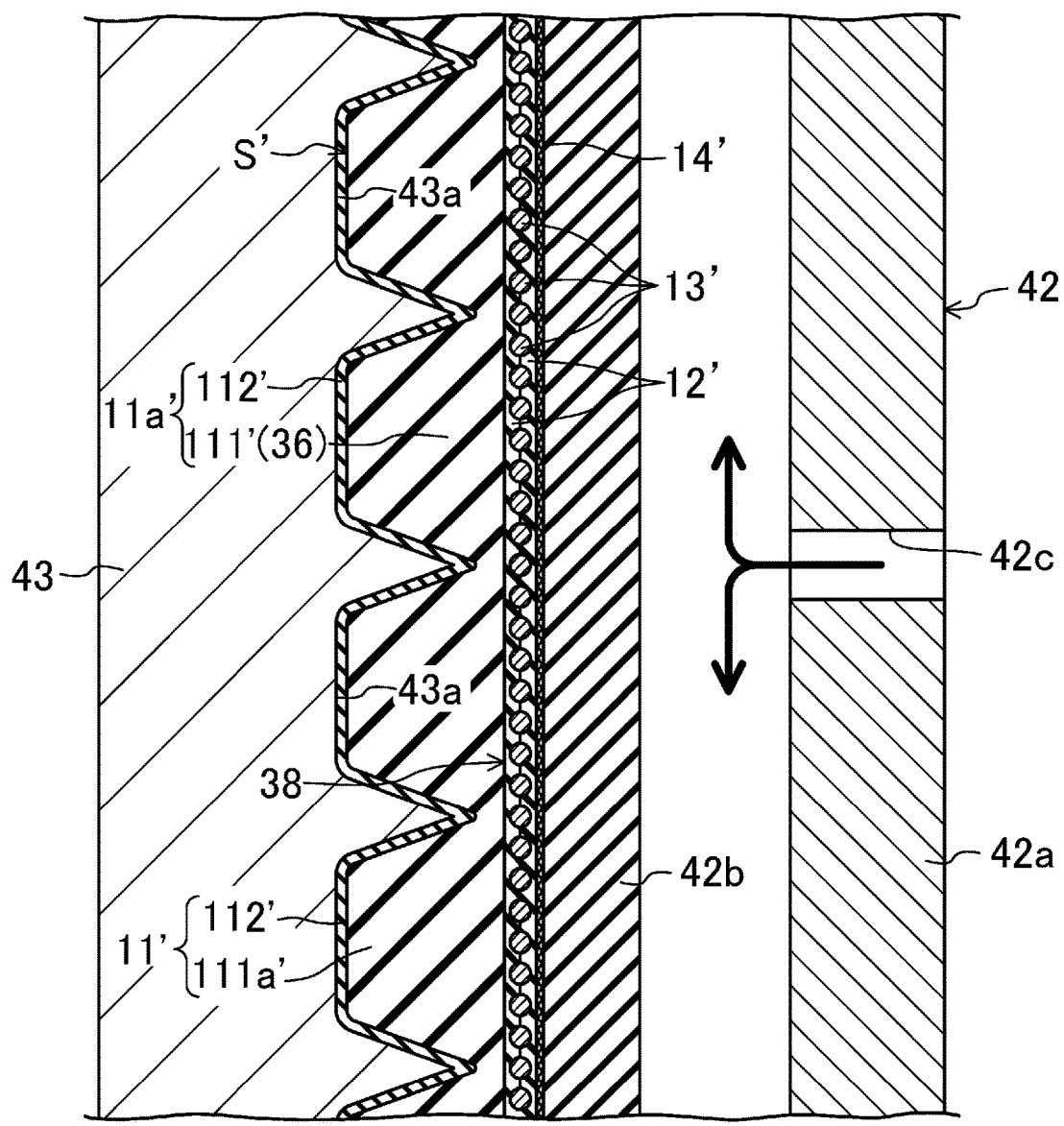
FIG. 8B is a second drawing showing the crosslinking step of the first production method.

As shown in FIG. 8B, the pressurizing means introduces high-pressure air into the drum body 42*a* of the expansion drum 42 so as to expand the expansion sleeve 42*b* radially outwardly. After a predetermined pressure is reached, heating is begun. This state is then maintained for a predetermined period of time. As a result, the entire surface rubber sheet 112' is heated uniformly. At this time, while having each of the compression layer-forming portions 11' fitted in the associated one of the compression layer-shaping grooves 43*a* of the cylindrical mold 43, the uncrosslinked slab S' is heated by the cylindrical mold 43 and pressed against the cylindrical mold 43 by the expansion sleeve 42*b* coming into contact with the uncrosslinked slab S'. Further, the rubber components in the surface rubber sheet 112', the core rubber sheet 111', and the adhesive rubber sheet 12' included in the uncrosslinked slab S' are crosslinked to be integrated with one another. As a result, a continuous structure of belt bodies 10 each including the compression layer 11 comprised of the surface rubber layer 112 and the core rubber layer 111 is produced for a plurality of V-ribbed belts B. At the same time, the rubber components adhere to, and are combined with, the cord 13' and the reinforcing fabric 14'. A cylindrical belt slab S is thus formed eventually. For example, the heating is carried out at a temperature of 100° C. to 180° C., the pressurization is carried out at a pressure of 0.5 MPa to 2.0 MPa, and the process continues for 10 minutes to 60 minutes.

Figure 9:
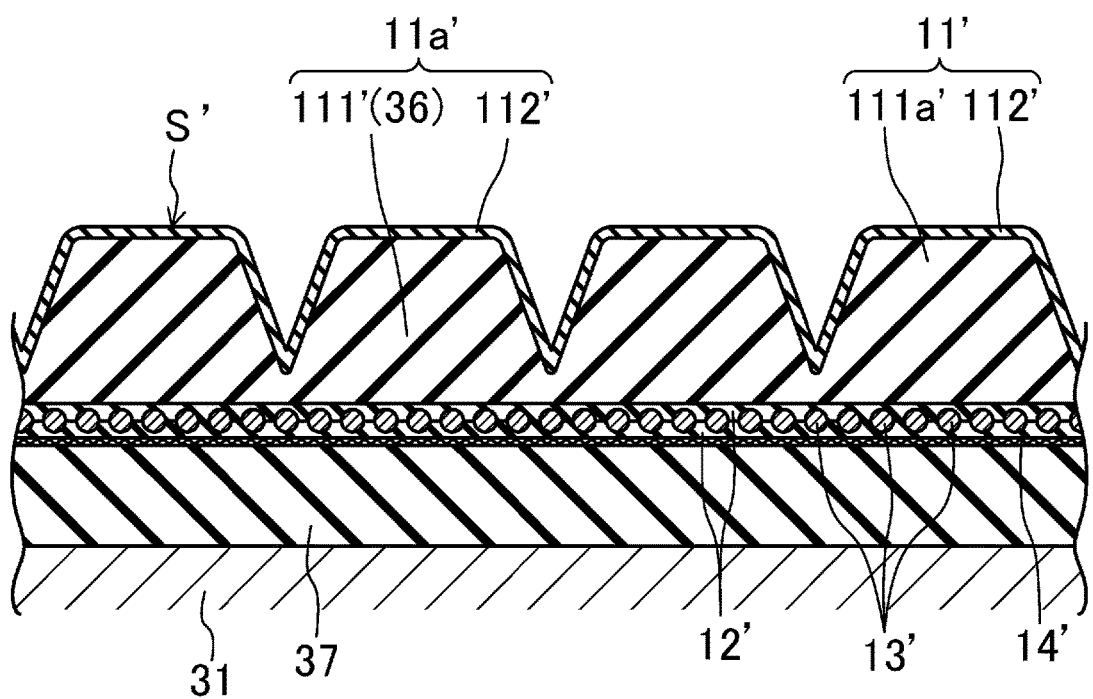
FIG. 9 shows a shaping step of a variation of the first production method.
Figure 10:
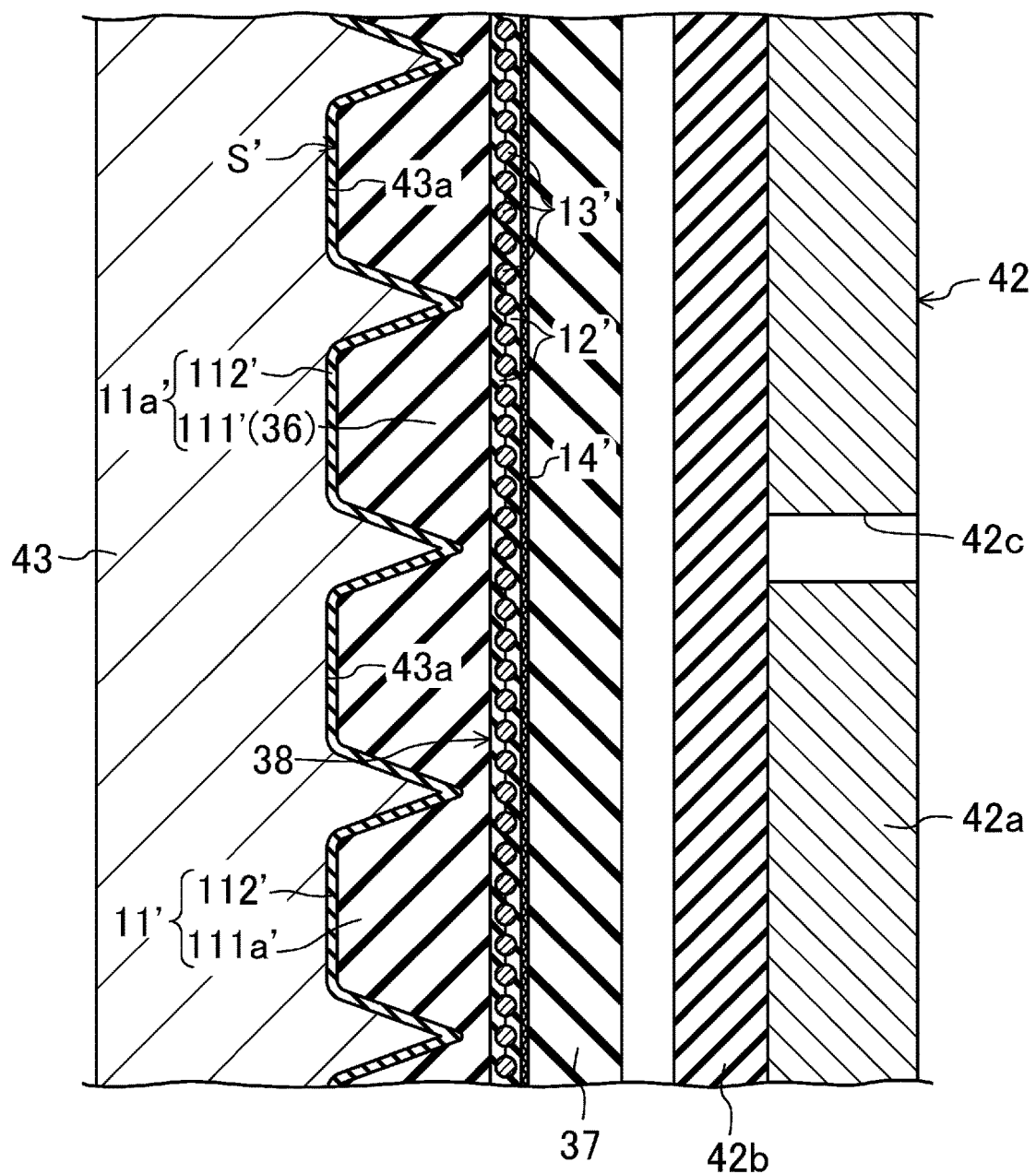
FIG. 10 shows a crosslinking step of a variation of the first production method.

The shaping step may be performed such that as shown in FIG. 9, a rubber-made shaping sleeve 37 is fitted over the shaping mandrel 31 and an uncrosslinked slab S' is formed on the shaping sleeve 37. In the crosslinking step, the uncrosslinked slab S' and the shaping sleeve 37 are together removed from the shaping mandrel 31. The removed slab S' and sleeve 37 are then set inside the cylindrical mold 43, as shown in FIG. 8A. In other words, the shaping sleeve 37 may be interposed between the expansion drum 42 and the uncrosslinked slab S'.

<Finishing Step>

In a finishing step, after the cylindrical mold 43 is cooled by the cooling means, the pressure inside the drum body 42*a* applied by the pressurizing means is released. The cylindrical mold 43 is detached from the base 41, and the belt slab S that has been formed in the cylindrical mold 43 is removed therefrom.

Figure 11:
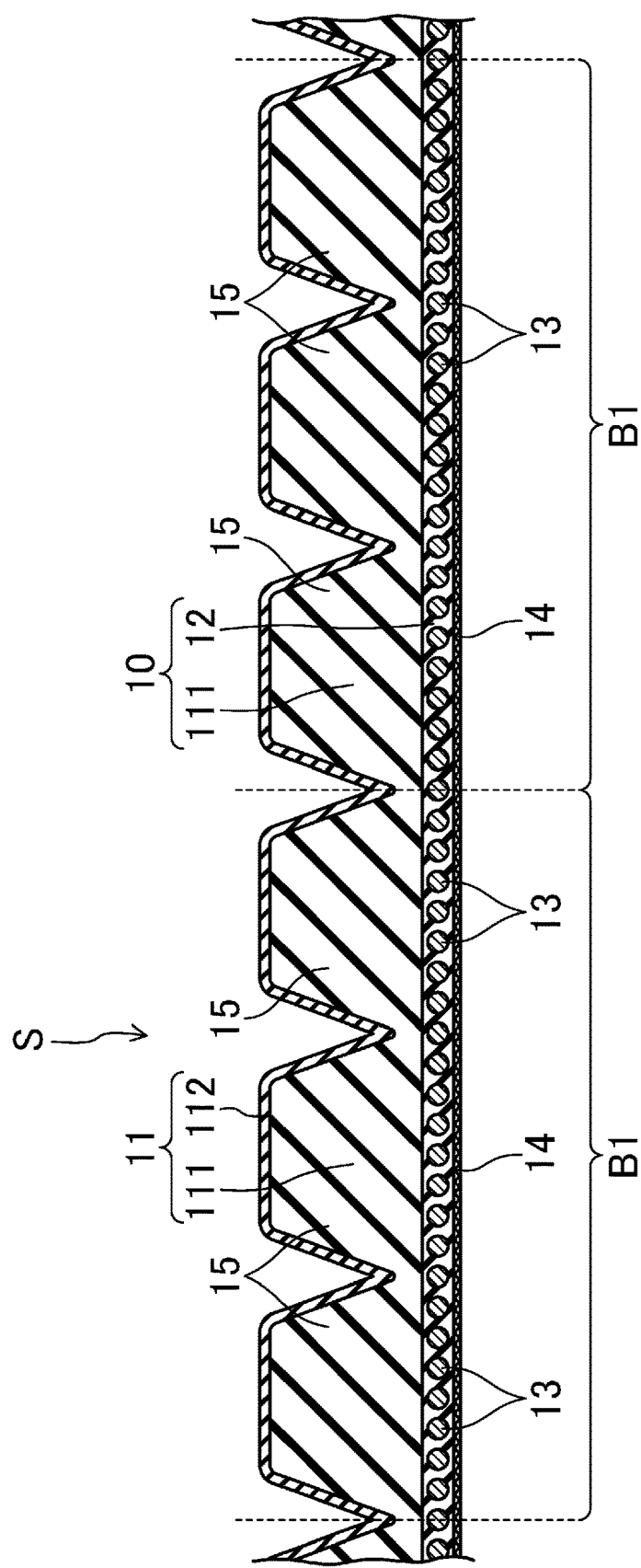
FIG. 11 shows a finishing step of the first production method.

As shown in FIG. 11, the belt slab S that has been removed from the cylindrical mold 43 is cut into ring-shaped pieces each having a plurality of compression layer-forming portions 11' (three compression layer-forming portions 11' in this embodiment). Each piece is turned inside out, thereby obtaining the V-ribbed belt B1 of this embodiment. If necessary, a surface treatment such as polishing may be provided to the outer peripheral surface of the belt slab S before being cut into the ring-shaped pieces, or the surface, of the V-ribbed belt B1, adjacent to the compression layer 11 after the cutting.

If the belt slab S is cut into ring-shaped pieces each having one compression layer-forming portion 11', a raw-edge V belt having the surface rubber layer 112 can be produced.

<Second Production Method>

A second production method will be described below with reference to FIGS. 12 and 13.

Figure 12:
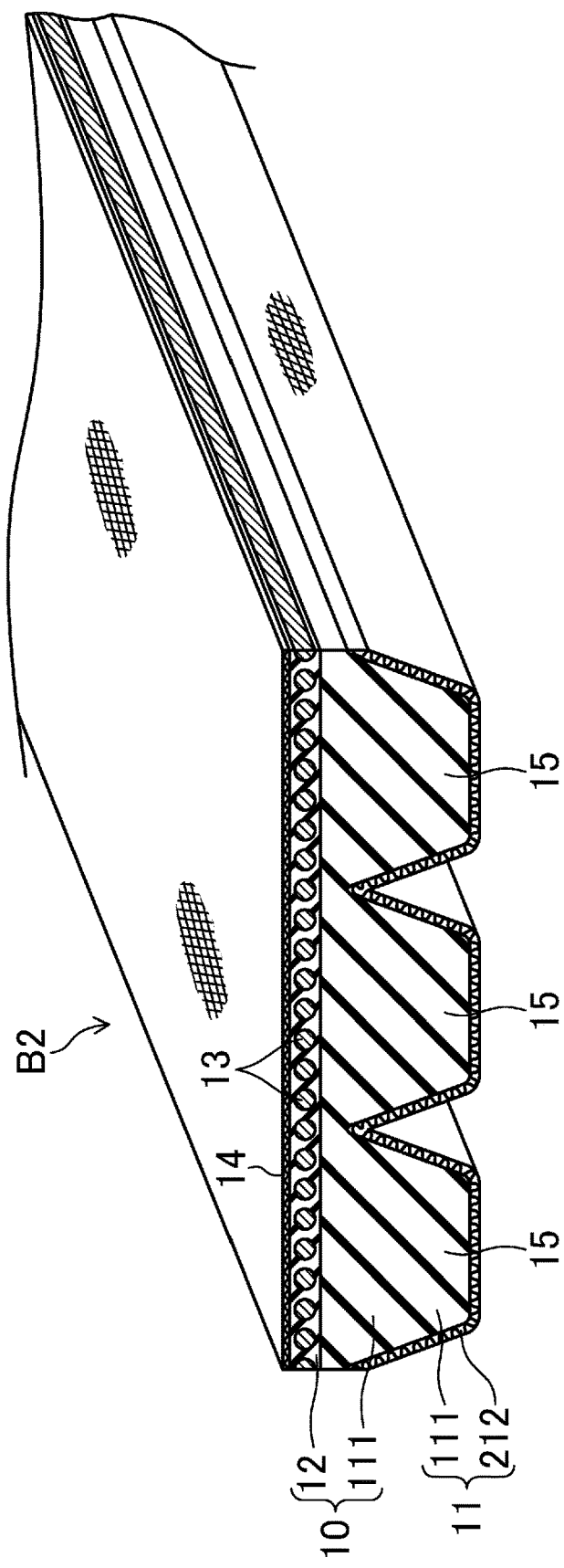
FIG. 12 is a perspective view of a V-ribbed belt produced by a second production method according to an embodiment.

FIG. 12 shows a V-ribbed belt B2 which is an example of belts produced by the second production method according to an embodiment.

The V-ribbed belt B2 differs from the V-ribbed belt B1 of the first production method described above in that the core rubber layer 111 of the V-ribbed belt B2 is covered not with the surface rubber layer 112, but with a covering fabric 212 (canvas) functioning a surface sheet.

The covering fabric 212 is comprised of a woven, knitted, or unwoven fabric made of nylon fibers, polyester fibers, aramid fibers, or cotton, for example. In a preferred embodiment, the covering fabric 212 is highly stretchable. An adhesion treatment may be provided to the covering fabric 212 to make the covering fabric 212 adhesive to the core rubber layer 111 of the belt body 10.

Figure 13:
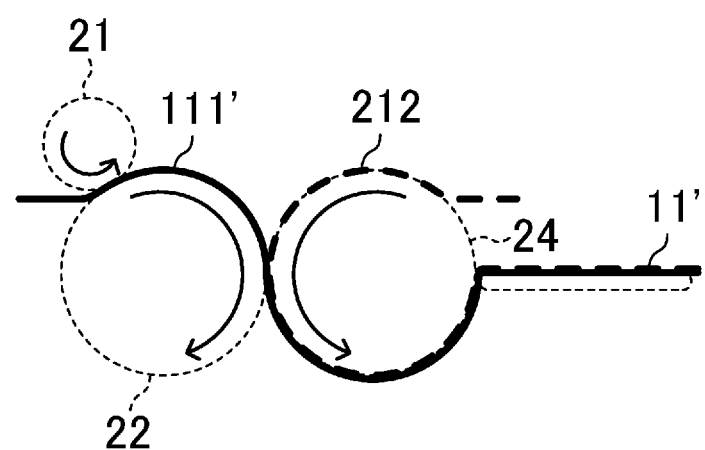
FIG. 13 is a front view schematically showing a two-layer bonding machine for use in the second production method.
Figure 14:
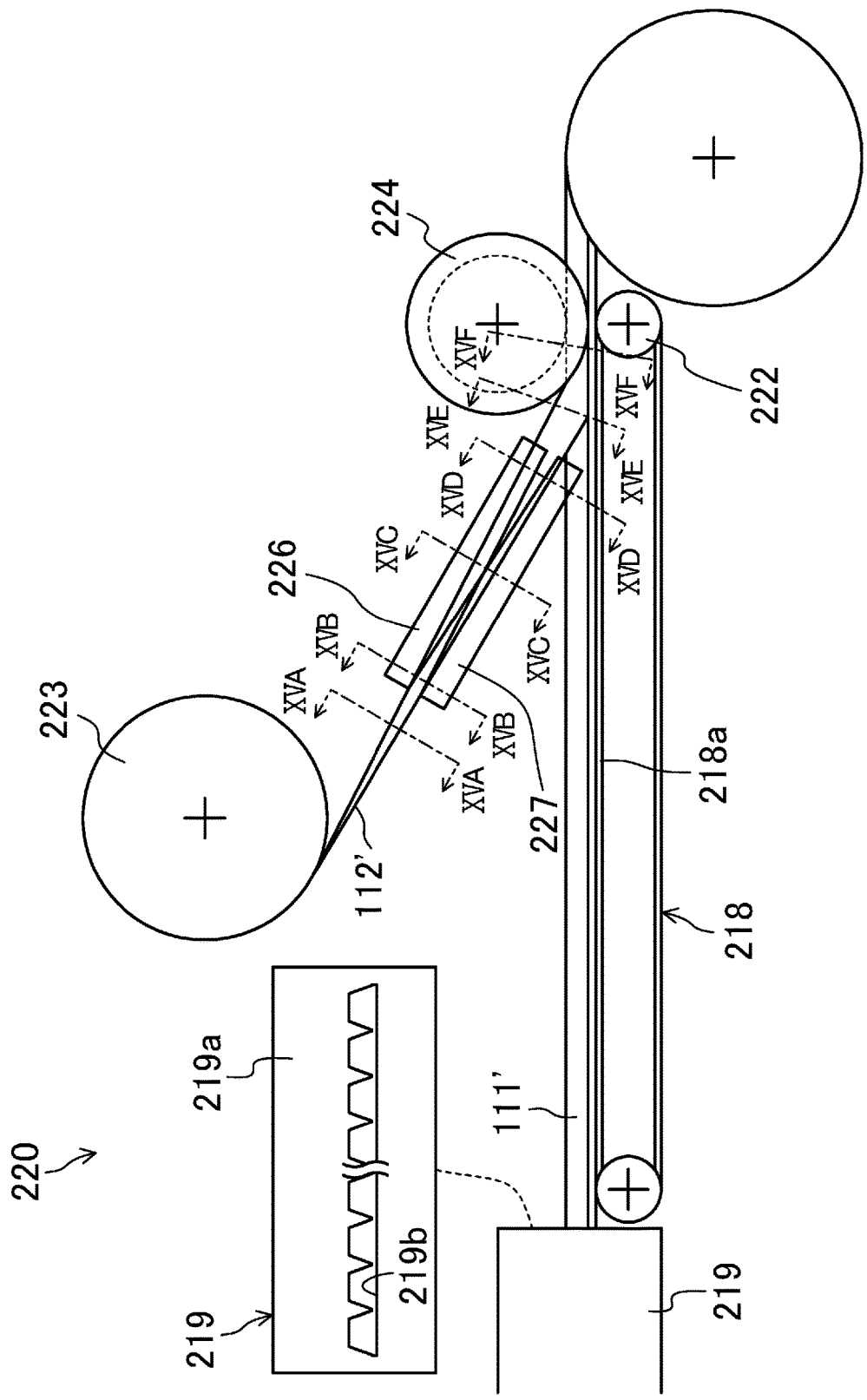
FIG. 14 is a front view schematically showing a two-layer bonding machine for use in a third production method.

FIG. 13 schematically shows a two-layer bonding machine 20 for use in the second production method. Unlike the two-layer bonding machine for use in the first production method described above, this two-layer bonding machine 20 does not include the surface-shaping ridged roll 23 having a plurality of trapezoidal ridges 23*a* corresponding to ridges and arranged in the axial direction. Thus, the two-layer bonding machine 20 for the second production method includes only three rolls which are similar to those of the machine for the first production method, namely, a core rubber-shaping grooved roll 21, a core rubber-shaping flat roll 22 having a flat surface, and a surface-shaping grooved roll 24.

For example, the core rubber-shaping flat roll 22 is heated to 90° C., and the other rolls are heated to 40° C. Also in the second production method, the temperature of the core rubber-shaping flat roll 22 is somewhat higher than those of the other rolls in view of the balance between the shaping and the separability from roll. This makes it easy for the core rubber sheet 111' to adhere to the core rubber-shaping flat roll 22.

For example, a gap G1 between the core rubber-shaping grooved roll 21 and the core rubber-shaping flat roll 22 is 0.1 mm, and a gap G2 between the core rubber-shaping flat roll 22 and the surface-shaping grooved roll 24 is 0.3 mm. It is desirable that the gaps G1 and G2 can also be adjusted independently.

For example, an uncrosslinked rubber sheet 111" in a flat state has a thickness of 4 mm. The covering fabric 212 in a flat state has a thickness of 0.3 mm to 0.6 mm. A compression layer-forming portion 11' having two-layer structure after bonding is reeled, for example, at a rate of 0.31 m/min.

In particular, the covering fabric 212 for use in the second production method is more stretchable than the surface rubber sheet 112' for use in the first production method. For this reason, once the covering fabric 212 is positioned on the trapezoidal grooves 24a of the surface-shaping grooved roll 24 such that the covering fabric 212 is not displaced, the core rubber sheet 111' becomes covered with the covering fabric 212 that has been deformed into a shape corresponding to the ridges when caused to run on the surface-shaping grooved roll 24, without having to press the covering fabric 212 with the surface-shaping ridged roll 23.

Thereafter, a shaping step, a crosslinking step, and a finishing step are suitably carried out in the same manner as those of the first production method.

Thus, in the case where the surface sheet is configured as the covering fabric 212, uncrosslinked rubber ridges that have been previously formed are covered with the covering fabric 212. Consequently, the grooves between the uncrosslinked rubber ridges stretch the entire covering fabric 212, which can be freely stretched, and then, the covering fabric 212 is bonded to the grooves between the ridges. This substantially prevents the covering fabric 212 from being stretched locally only in the grooves between the ridges, enabling the covering fabric 212 to be bonded while being stretched a little and uniformly. In addition, since the uncrosslinked rubber already has ridges corresponding to the shapes of ribs, almost no flow occurs in the uncrosslinked rubber when the uncrosslinked rubber is bonded. Thus, the rubber is substantially prevented from seeping through roughed texture of the covering fabric 212 to the surface. Thus, a simply-configured and inexpensive fabric which has a small stretchability can be used as the covering fabric 212.

<Third Production Method>

A third production method will be described below with reference to FIGS. 14 and 15A to 15F.

The third production method is capable of producing both a V-ribbed belt B1 having a surface rubber layer 112 and a V-ribbed belt B2 having a covering fabric 212.

The third production method will be described below based on a V-ribbed belt B1 as produced by the first production method, i.e., the V-ribbed belt B1 having the surface rubber layer 112. In the following description, the same materials as those in the first production method will be used. However, different materials may be used.

A two-layer bonding machine 220 for use in the third production method includes an extruder 219. A rubber component and compound ingredients are kneaded together by using a kneading machine such as a kneader or a Banbury mixer to obtain an uncrosslinked rubber composition. The obtained uncrosslinked rubber composition is extruded through a through hole 219b formed in a die 219a of the extruder 219, for example. As a result, a core rubber sheet 111' is obtained which has, on one of its surfaces, a plurality of core rubber layer-forming portions 111a' that are comprised of linearly-extending ridges, extend parallel to each other, and are arranged adjacent to each other. While being extruded, the core rubber sheet 111' is provided on a conveyer belt 218a of a conveyer 218 moving at a constant speed. It is undesirable to employ two-layer co-extrusion at this stage because the two-layer co-extrusion will result in the cross-sectional shape as shown in FIG. 5B.

In the two-layer bonding machine 220 for this production method includes a core rubber-shaping flat roll 222 rotatably provided downstream of the conveyor 218. Since the conveyor belt 218a, which supports one of the surfaces of the core rubber sheet 111', is suitably flat and relatively resistant to adhesion of rubber.

Figure 15A:
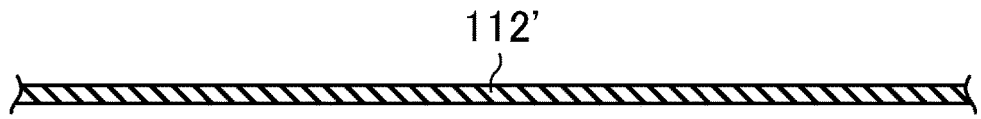
FIG. 15A is a cross-sectional view taken along line XVA-XVA of FIG. 14.
Figure 15B:
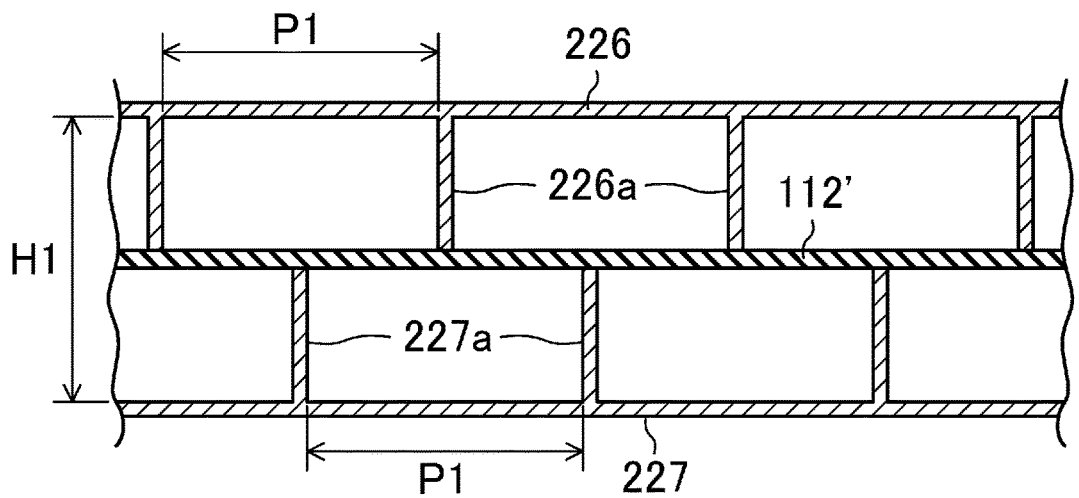
FIG. 15B is a cross-sectional view taken along line XVB-XVB of FIG. 14.

As also shown in FIG. 15B, the two-layer bonding machine 220 includes a pair of an upper pleating member 226 and a lower pleating member 227. The upper pleating member 226 has upper ribs 226a which are arranged to correspond to the tops of the ridges. The lower pleating member 227 has lower ribs 227a which are arranged to correspond to grooves between the ridges. The upper ribs 226a and the lower ribs 227a stand respectively on the upper and lower pleating members 226 and 227 such that the intervals between the upper ribs and the intervals between the lower ribs decrease downstream.

Specifically, a lateral pitch P1 is wide and a vertical pitch H1 is maximum in an upstream end portion of each of the upper and lower pleating members 226 and 227.

Figure 15C:
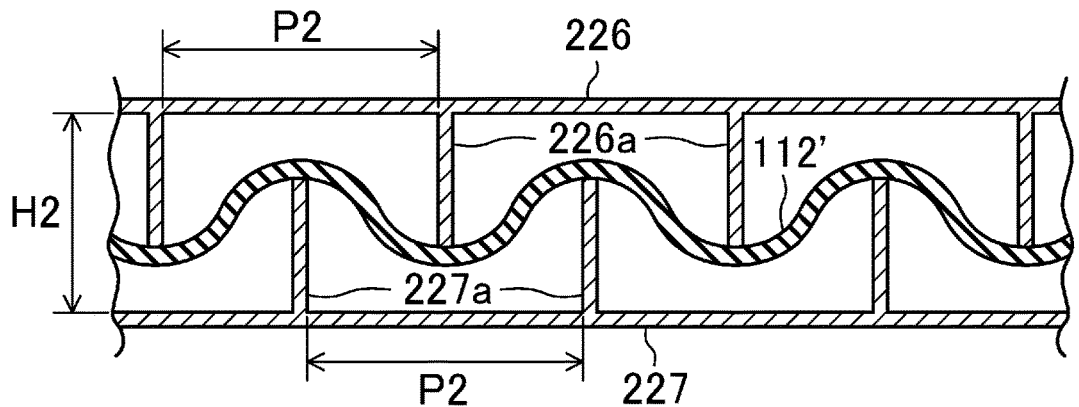
FIG. 15C is a cross-sectional view taken along line XVC-XVC of FIG. 14.

As shown in FIG. 15C, in a downstream portion of each of the upper and lower pleating members 226 and 227, the lateral pitch P2 is almost the same as the lateral pitch P1, whereas a vertical pitch H2 is smaller than the vertical pitch H1 (H2<H1). This structure gradually deforms a surface rubber sheet 112' into a corrugated shape, as it goes downstream.

Figure 15D:
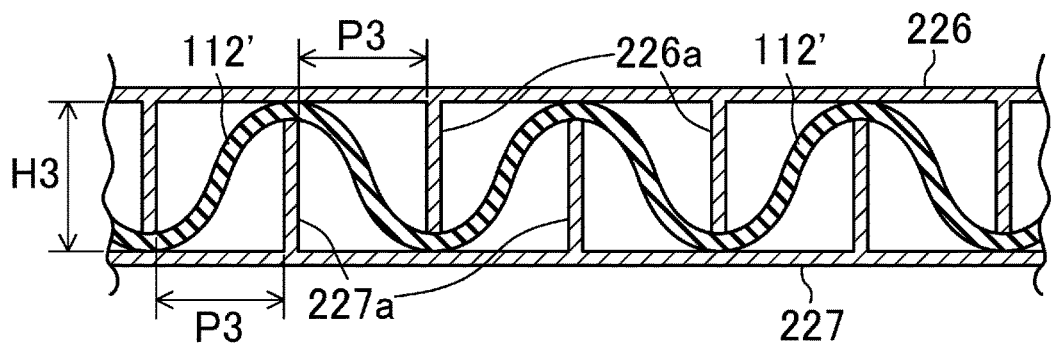
FIG. 15D is a cross-sectional view taken along line XVD-XVD of FIG. 14.

As shown in FIG. 15D, in a further downstream portion of each of the upper and lower pleating members 226 and 227, a lateral pitch P3 is smaller than the lateral pitch P2 (P3<P2), and a vertical pitch H3 is also smaller than the vertical pitch H2 (H3<H2). This structure deforms the surface rubber sheet 112' to make the surface rubber sheet 112' have the pitch almost the same as that of the ridges of the core rubber sheet 111'.

Thus, the surface rubber sheet 112' functioning as a surface sheet has a flat shape immediately after passing a surface sheet roll 223 as shown in FIG. 15A. As the surface rubber sheet 112' is introduced and passed between the upper and lower pleating members 226 and 227, it is gradually deformed into a shape having alternating ridges and grooves as shown in FIGS. 15B to 15D.

That is, in the surface sheet deforming step, the surface rubber sheet 112' is deformed into a pleated shape corresponding to the ridges while passing between the pair of upper and lower pleating members 226 and 227. In addition, the upper ribs 226a and the lower ribs 227a stand such that the intervals between the upper ribs 226a and the intervals between the lower ribs 227a decrease downstream. Therefore, in the surface sheet deforming step, the surface rubber sheet 112' whose original shape is flat is processed such that the pitches of the pleats gradually decreases in the length direction as the surface rubber sheet 112' continuously passes between the pair of the pleating members 226 and 227.

Figure 15E:
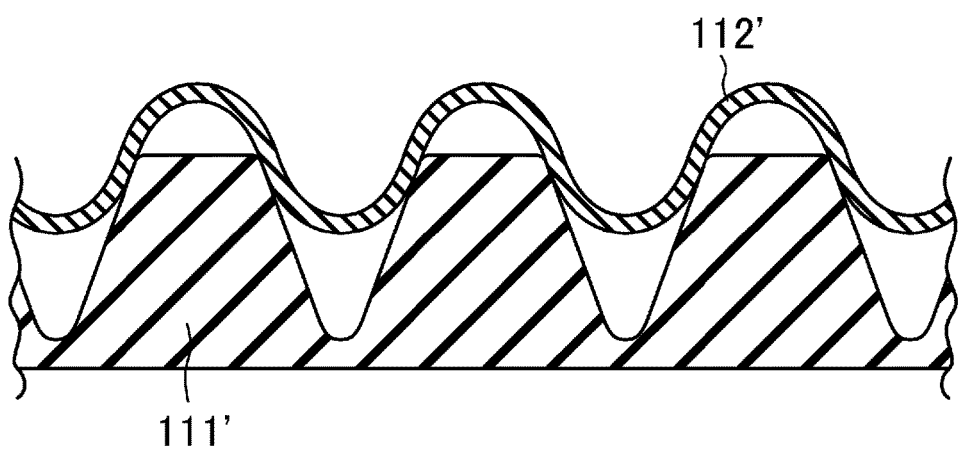
FIG. 15E is a cross-sectional view taken along line XVE-XVE of FIG. 14.

When reaching the downstream end of the space between the pair of the pleating members 226 and 227, the surface rubber sheet 112' has been deformed to have a shape similar to the outer surface of the core rubber layer-forming portions 111a'. Therefore, as shown in FIG. 15E, the surface rubber sheet 112' is easily fitted on the outer surface of the core rubber sheet 111'.

Figure 15F:
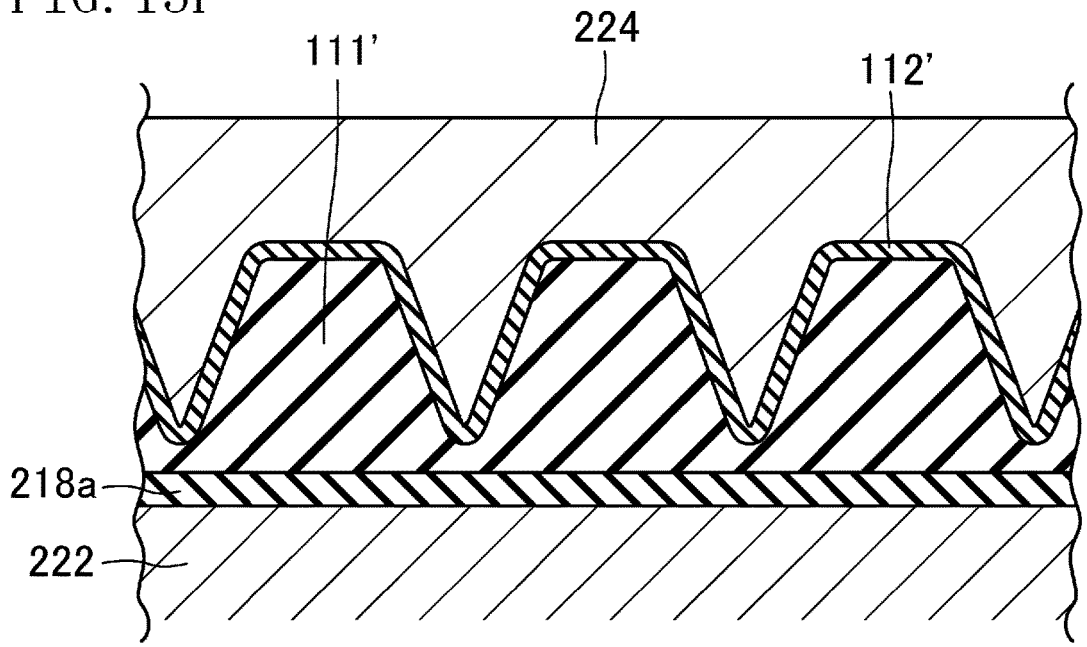
FIG. 15F is a cross-sectional view taken along line XVF-XVF of FIG. 14.

Subsequently, in a bonding step, when passing between a core rubber-shaping flat roll 222 and a surface-shaping grooved roll 224 having a plurality of trapezoidal grooves 24a each of which corresponds to the ridge and which are arranged in the axial direction, the surface rubber sheet 112' is bonded to the core rubber sheet 111', as shown in FIG. 15F. Having already been deformed into the shape with alternating ridges and grooves, the surface rubber sheet 112' is substantially prevented from stretching significantly when being bonded. This results in a surface layer having a substantially uniform thickness, substantially avoiding a situation which is especially adverse to the performance of a belt: almost no surface rubber layer is formed at bottom portions of ribs. As a result, the durability of the surface rubber layer 112 is ensured.

Just like in the first production method, the core rubber sheet 111' covered with the surface rubber sheet 112' can be wrapped around an adhesive rubber sheet 12' to prepare an uncrosslinked slab S'.

Thereafter, a shaping step, a crosslinking step, and a finishing step are suitably carried out in the same manner as those of the first production method.

Other Embodiments

The above embodiments of the present disclosure may be configured as follows.

In the embodiments described above, the uncrosslinked slab S' is crosslinked by using the cylindrical mold 43. However, the present disclosure is not particularly limited to this. For example, the uncrosslinked slab is suspended between two shafts, and a portion of the uncrosslinked slab is press molded between a flat-shaped mold and a plate-shaped belt mold having a plurality of compressed rubber layer-shaping grooves which are arranged adjacent to each other in the groove width direction. The uncrosslinked slab is crosslinked while being passed in the circumferential direction.

Figure 16A:
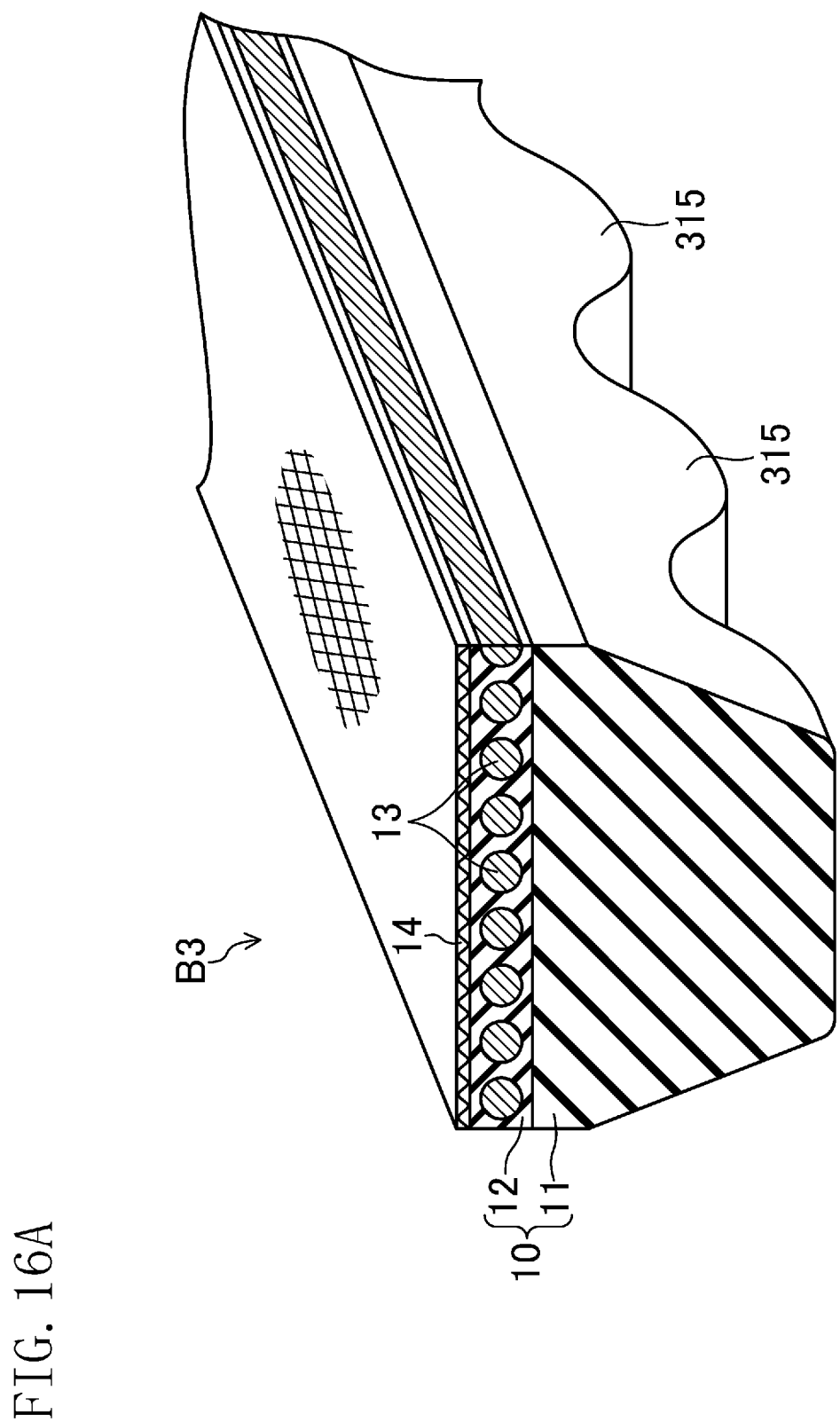
FIG. 16A is a perspective view of a single cogged raw edge V-belt produced according to another embodiment.
Figure 16B:
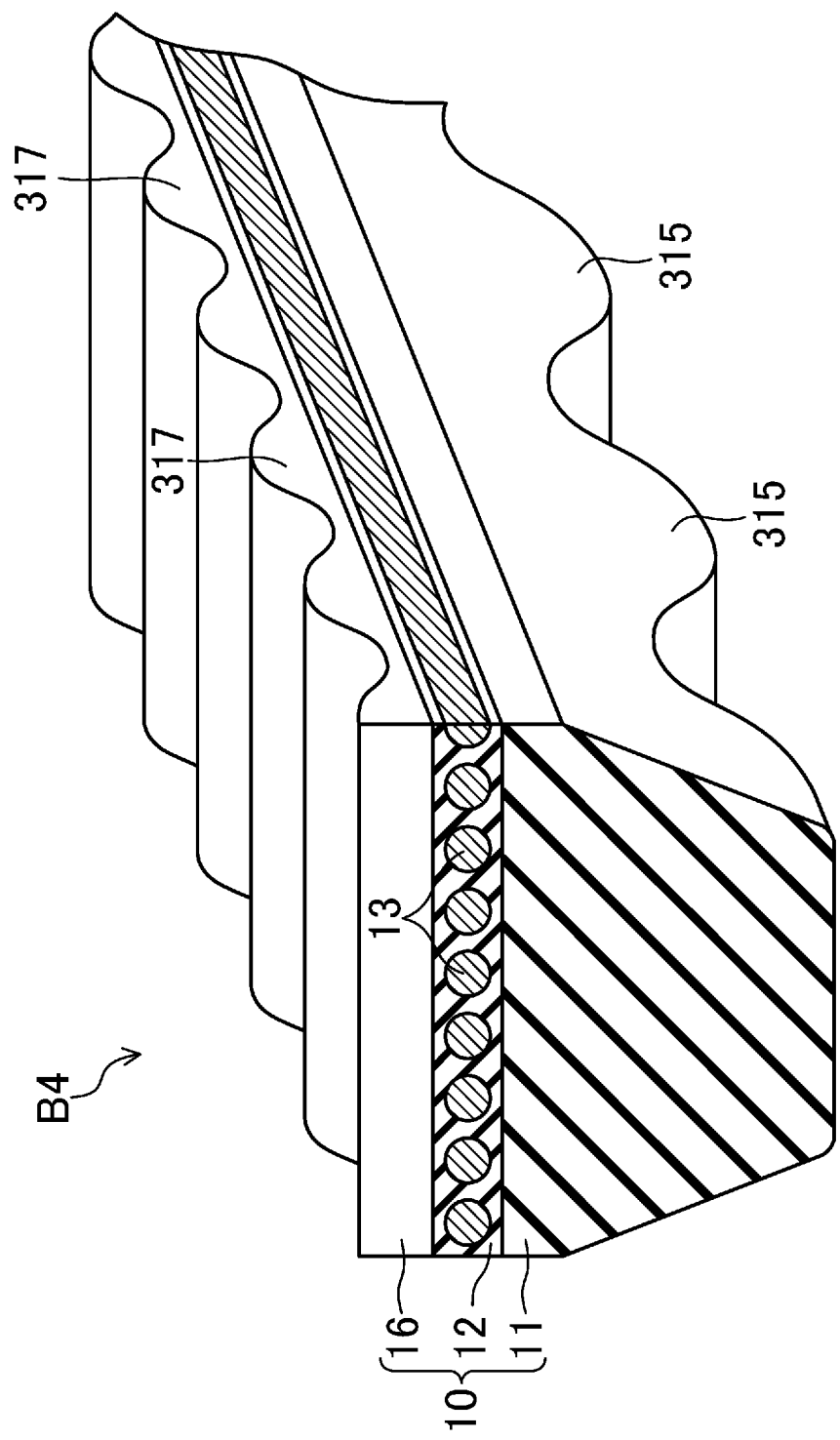
FIG. 16B is a perspective view of a double cogged raw edge V-belt produced according to another embodiment.
Figure 17A:
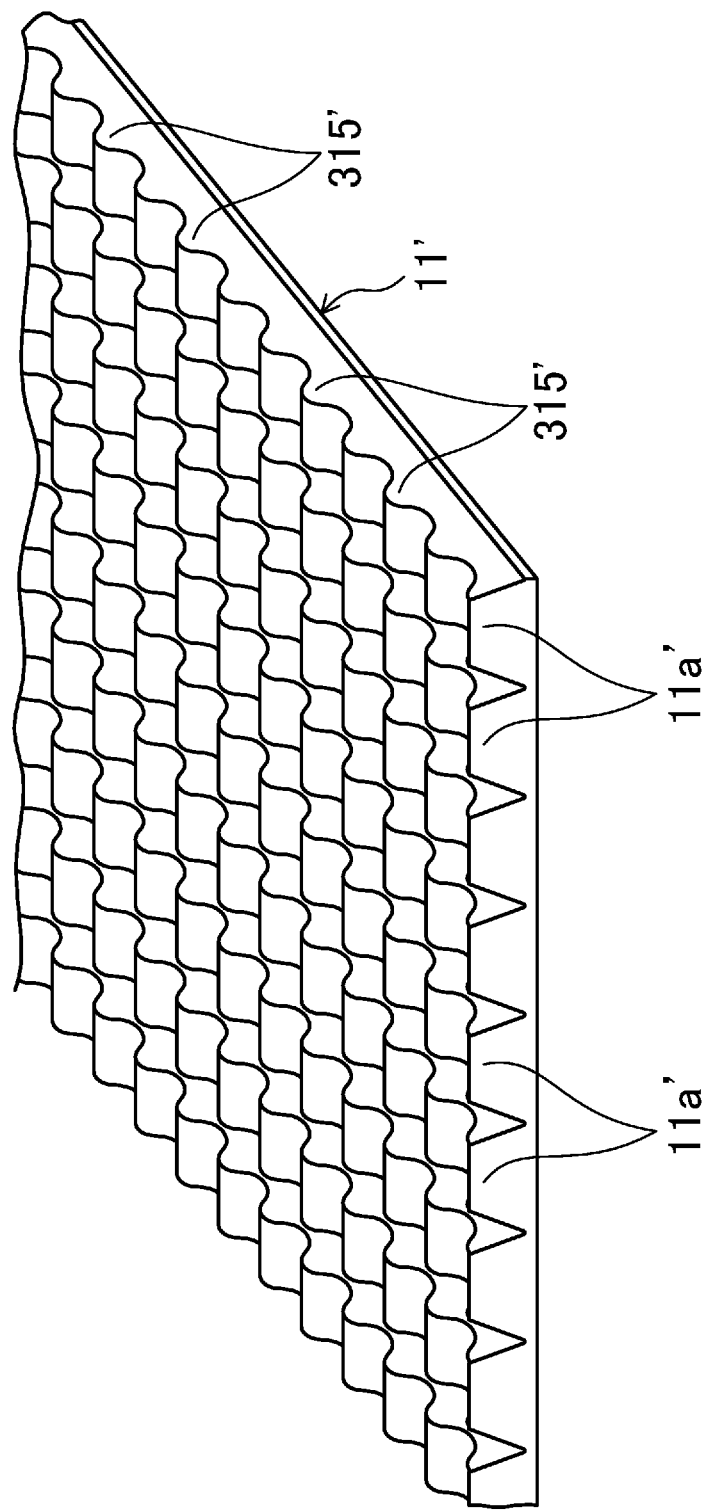
FIG. 17A is a perspective view of a compressed rubber sheet for use in another embodiment.
Figure 17B:
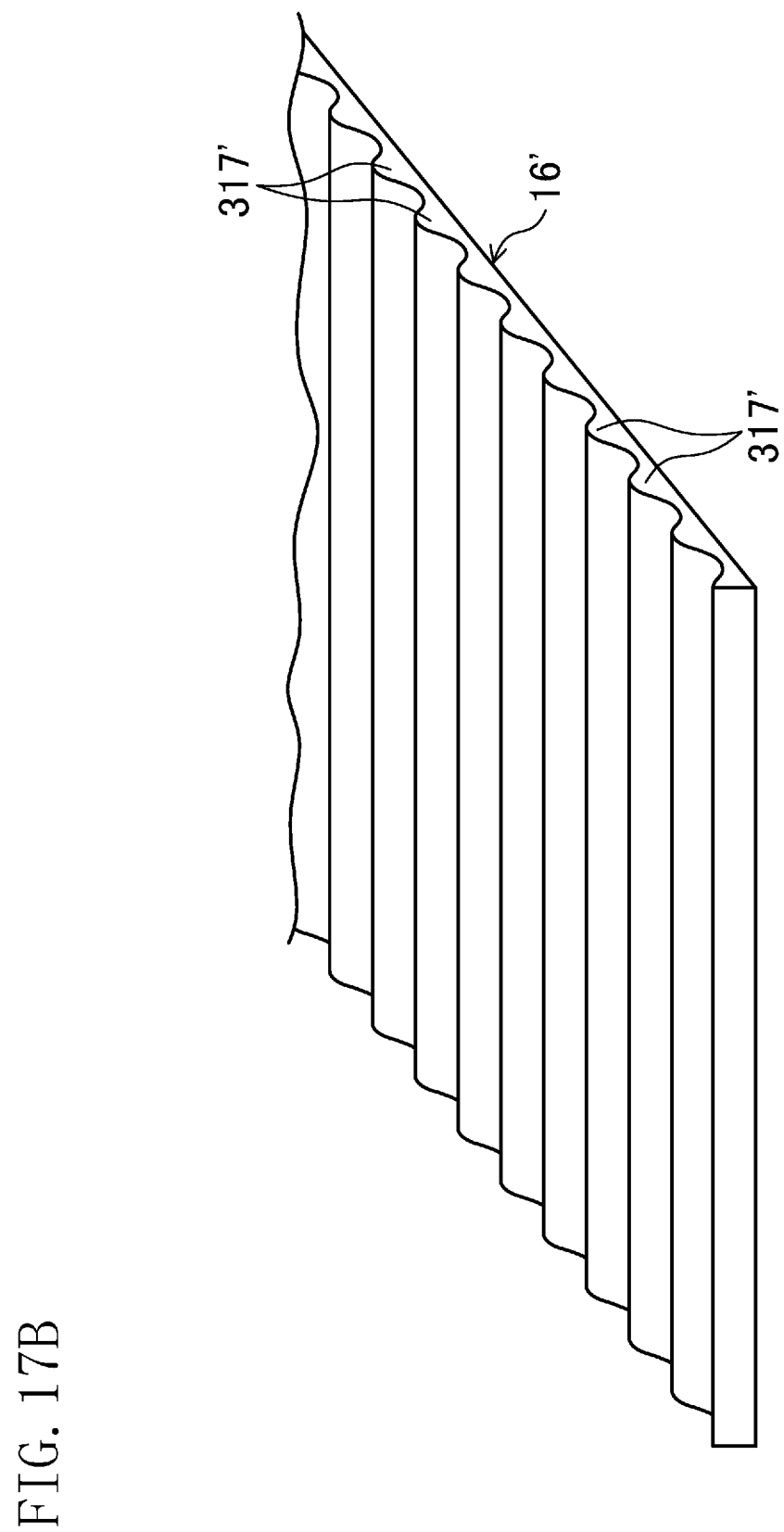
FIG. 17B is a perspective view of a stretch rubber sheet for use in another embodiment.

In the above embodiments, the V-ribbed belts B1 and B2 have been described as non-limiting examples. For example, the present disclosure is also applicable to production of a single cogged raw edge V-belt B3 including a compression layer 11 having lower cogs 315 as shown in FIG. 16A, and a double cogged raw edge V-belt B4 including a compressed rubber layer 11 having upper cogs 315 and a stretch rubber layer 16 having lower cogs 317 as shown in FIG. 16B. In the case of producing the raw edge V-belts B3 and B4 including the compressed rubber layer 11 having lower cogs 315, it is suitable to use a compressed rubber sheet 11a' having lower cog-forming portions 315' as shown in FIG. 17A. In the case of producing the raw edge V-belt B4 including the stretch rubber layer 16 having upper cogs 317, it is suitable to use a stretch rubber sheet 16' having upper cog-forming portions 317' as shown in FIG. 17B. The compressed rubber sheet 11a' having the lower cog-forming portions 315' and the stretch rubber sheet 16' having the upper cog-forming portions 317' can be prepared by a method similar to the first production method. Specifically, it is suitable to arrange, in the longitudinal direction of the trapezoidal grooves 21a of the core rubber-shaping grooved roll 21, protrusions and depressions for forming the upper cog-forming portions 317' or the lower cog-forming portions 315'. In the above embodiments, the V-ribbed belt B1 covered with the surface rubber layer 112 and the V-ribbed belt B2 covered with the covering fabric 212 have been described. However, the present disclosure is also applicable to a V-ribbed belt covered with a surface film such as a resin film. Further, as described early, by cutting a belt slab into pieces each having one ridge, a raw edge V-belt covered with the surface rubber layer 112, a raw edge V-belt covered with the covering fabric 212, and a raw edge V-belt covered with the surface film can be produced.

In each of the embodiments described above, the obtained shaped structure has been used as the V-shaped portions of the V-ribbed belts B1 and B2 and the raw edge V-belt as a non-limiting example. However, if the shaped structure is rotated by 90° and then cut, the shaped structure can also be used to form the cog shapes of a cogged V-belt or the tooth shapes of a toothed belt.

The above embodiments each include the core rubber layer 111. This layer may be made of a thermoplastic elastomer.

The foregoing embodiments are merely preferable examples in nature, and are not intended to limit the scope, application, or uses of the present disclosure.

What is claimed is:

1. A method of producing a belt including a compression layer comprised of a surface layer and a core layer, the surface layer forming a surface portion of the belt, the core layer forming an inner portion, of the belt, having one or a plurality of ridges, the method comprising:
   preparing a surface sheet which is to constitute the surface layer, a core sheet which is to constitute the core layer, a core-shaping flat roll having a flat surface, and a surface-shaping grooved roll having a plurality of trapezoidal grooves each of which corresponds to the ridge and which are arranged in an axial direction of the surface-shaping grooved roll;
   forming the plurality of ridges on a surface of the core sheet by passing the core sheet between the core-shaping flat roll and a core-shaping grooved roll having a plurality of trapezoidal grooves each of which corresponds to the ridge and which are arranged in an axial direction of the core-shaping grooved roll; and
   while the core-shaping flat roll and the surface-shaping grooved roll are heated such that core-shaping flat roll has a higher temperature than the surface-shaping grooved roll, bonding the surface sheet to the core sheet having the plurality of ridges formed thereon, thereby forming a compression layer-forming portion, the bonding being carried out by passing the surface sheet and the core sheet between the core-shaping flat roll and the surface-shaping grooved roll, wherein the surface sheet is processed to have a shape corresponding to the plurality of ridges when being passed between the rolls.

2. The method of claim 1, wherein
   the forming the plurality of ridges is carried out by passing the core sheet between the core-shaping grooved roll and the core-shaping flat roll in an upstream portion, and thereafter
   the bonding is carried out by bonding the surface sheet on the surface of the core sheet that has moved on the core-shaping flat roll.

3. The method of claim 1, further comprising:
   deforming the surface sheet into a shape corresponding to the ridges by passing the surface sheet between the surface-shaping grooved roll and a surface-shaping ridged roll having a plurality of trapezoidal ridges which correspond to the grooves of the surface-shaping grooved roll and are arranged adjacent to each other in an axial direction of the surface-shaping ridged roll.

4. The method of claim 1, further comprising:
deforming the surface sheet into a shape corresponding to the ridges by causing the surface sheet to wrap around a portion of the surface-shaping grooved roll as the surface-shaping grooved roll is rotationally driven, wherein
the bonding of the surface sheet to the core sheet is carried out while the surface sheet deformed into the shape corresponding to the ridges is placed over the surface of the core sheet.

5. The method of claim 1, wherein
the surface sheet is comprised of a covering fabric.

6. The method claim 1, wherein
the surface sheet is comprised of a surface rubber sheet.

7. A method of producing a belt including a compression layer comprised of a surface layer and a core layer, the surface layer forming a surface portion of the belt, the core layer forming an inner portion, of the belt, having one or a plurality of ridges, the method comprising:
preparing a surface sheet which is to constitute the surface layer, a core sheet which is to constitute the core layer, a core-shaping flat roll having a flat surface, and a surface-shaping grooved roll having a plurality of trapezoidal grooves each of which corresponds to the ridge and which are arranged in an axial direction of the surface-shaping grooved roll;
forming the plurality of ridges on a surface of the core sheet;
while the core-shaping flat roll and the surface-shaping grooved roll are heated such that core-shaping flat roll has a higher temperature than the surface-shaping grooved roll, bonding the surface sheet to the core sheet having the plurality of ridges formed thereon, thereby forming a compression layer-forming portion, the bonding being carried out by passing the surface sheet and the core sheet between the core-shaping flat roll and the surface-shaping grooved roll, wherein the surface sheet is processed to have a shape corresponding to the plurality of ridges when being passed between the rolls;
forming a shaped structure by wrapping the core sheet having the surface sheet bonded thereon around a layered structure in which the layered structure includes a cord and rubber or a thermoplastic elastomer that are stacked together, the shaped structure having a cylindrical shape and including a plurality of ridges extending in a circumferential direction and arranged adjacent to each other in an axial direction of the shaped structure;
crosslinking the shaped structure; and
cutting the crosslinked shaped structure into pieces each including at least one of the ridges.

8. A two-layer bonding machine configured to bond a surface sheet and a core sheet together, the surface sheet constituting a surface layer of a belt, the core sheet constituting a core layer forming an inner portion, of the belt, having one or a plurality of ridges, the machine comprising:
a core-shaping flat roll having a flat surface and configured to press the core sheet; and
a surface-shaping grooved roll having a plurality of trapezoidal grooves each of which corresponds to the ridge and which are arranged in an axial direction of the surface-shaping grooved roll, the surface-shaping grooved roll being configured to press the surface sheet, wherein
the core-shaping flat roll and the surface-shaping grooved roll are capable of being heated to different temperatures,
the core-shaping flat roll is heated to a higher temperature than the surface-shaping grooved roll; and
a core-shaping grooved roll having a plurality of trapezoidal grooves each of which corresponds to the ridge and which are arranged in an axial direction of the core-shaping grooved roll, wherein
the core-shaping grooved roll is disposed at a position at which the core-shaping grooved roll presses the core sheet in conjunction with the core-shaping flat roll.

* * * * *